United States Patent [19]

Morokawa et al.

[11] Patent Number: 5,815,233
[45] Date of Patent: Sep. 29, 1998

[54] OPTICAL DEVICE CONTAINING A LIQUID CRYSTAL ELEMENT FOR CHANGING OPTICAL CHARACTERISTICS OF A LENS ELEMENT

[75] Inventors: Shigeru Morokawa, Higashi-yamato; Yasuhiro Takaki, Yokohama, both of Japan

[73] Assignee: Citizen Watch Co., Ltd., Japan

[21] Appl. No.: 949,815

[22] Filed: Oct. 14, 1997

Related U.S. Application Data

[63] Continuation of Ser. No. 343,507, filed as PCT/JP94/00542, Nov. 29, 1994, published as WO94/23329, Oct. 13, 1994, abandoned.

[30] Foreign Application Priority Data

Mar. 31, 1993 [JP] Japan ................................. 5-108692

[51] Int. Cl.[6] ........................... G02F 1/13; G02F 1/1335
[52] U.S. Cl. ............................................ 349/200; 349/57
[58] Field of Search ................................ 359/39, 40, 41, 359/94; 349/200, 57

[56] References Cited

U.S. PATENT DOCUMENTS

| 4,436,376 | 3/1984 | Fergason ................................. 359/40 |
|---|---|---|
| 4,601,545 | 7/1986 | Kern ....................................... 350/347 |
| 5,018,838 | 5/1991 | Barnes et al. ......................... 350/345 |
| 5,071,229 | 12/1991 | Oaks et al. ............................ 349/200 |
| 5,095,459 | 3/1992 | Ohta et al. ............................ 395/25 |
| 5,150,234 | 9/1992 | Takahashi et al. .................... 349/200 |
| 5,451,766 | 9/1995 | Van Berkel .......................... 349/200 |
| 5,477,354 | 12/1995 | Schehrer ................................ 359/53 |

FOREIGN PATENT DOCUMENTS

| 55-76323 | 6/1980 | Japan . | |
|---|---|---|---|
| 59-224821 | 12/1984 | Japan ..................................... 359/94 |
| 61-502221 | 10/1986 | Japan . | |
| 62-129816 | 6/1987 | Japan . | |
| 62-194221 | 8/1987 | Japan . | |
| 63-249125 | 10/1988 | Japan . | |
| 2-20821 | 1/1990 | Japan . | |
| 2-110428 | 4/1990 | Japan ..................................... 349/200 |
| 2-226102 | 9/1990 | Japan ..................................... 349/200 |
| 3-4211 | 1/1991 | Japan . | |
| 3-265819 | 11/1991 | Japan . | |
| 3-279913 | 12/1991 | Japan . | |
| 4-240817 | 8/1992 | Japan . | |
| 4-221927 | 8/1992 | Japan . | |
| 4-287014 | 10/1992 | Japan . | |
| 4-371912 | 12/1992 | Japan . | |
| 4-346311 | 12/1992 | Japan . | |
| 5-341253 | 12/1993 | Japan ..................................... 359/40 |

OTHER PUBLICATIONS

S.E. Broomfield et al., "Programmable diffractive optics with a ferro-electric liquid crystal SLM in a binary phase-only mode," Holographics International 1732(1992) pp. 287–296.
M.W. Fritsch et al., "Twisted-Nematic Liquid Crystals for Phase Modulation in Schlieren Optical Projection Systems," Proceedings of the SID, vol. 32(1991)No. 4, pp. 305–309.
T.H. Barnes et al.,"Phase–only modulation using a twisted nematic liquid crystal television," Applied Optics, 28(1989) 11/15. No. 22 pp. 4845–4852.
M.J. O'Callaghan et al., "Diffractive ferroelectric liquid–crystal shutters for unpolarized light," Optic Letters, 16(1991) 5/15 No. 10, pp. 770–772.
International Search Report dated Jul. 05, 1994 for International Application No. PCT/JP94/00542.

Primary Examiner—William L. Sikes
Assistant Examiner—Tiep H. Nguyen
Attorney, Agent, or Firm—Finnegan, Henderson, Farabow, Garrett & Dunner, L.L.P.

[57] ABSTRACT

A liquid crystal active lens having, in combination, a fixed-focal-point lens having a high index of refraction and a phase modulation element comprising two-dimensionally arranged fine pixels, and having power and being capable of electrically controlling the lens characteristics as a function of space. An electrically controlled optical system can be realized without having a moving portion. Owing to the combination of the liquid crystal element for modulating space phase and the high-power lens of a fixed focal length, it is possible to electronically control the focal length and to electronically control the lens in a spatially split manner.

15 Claims, 24 Drawing Sheets

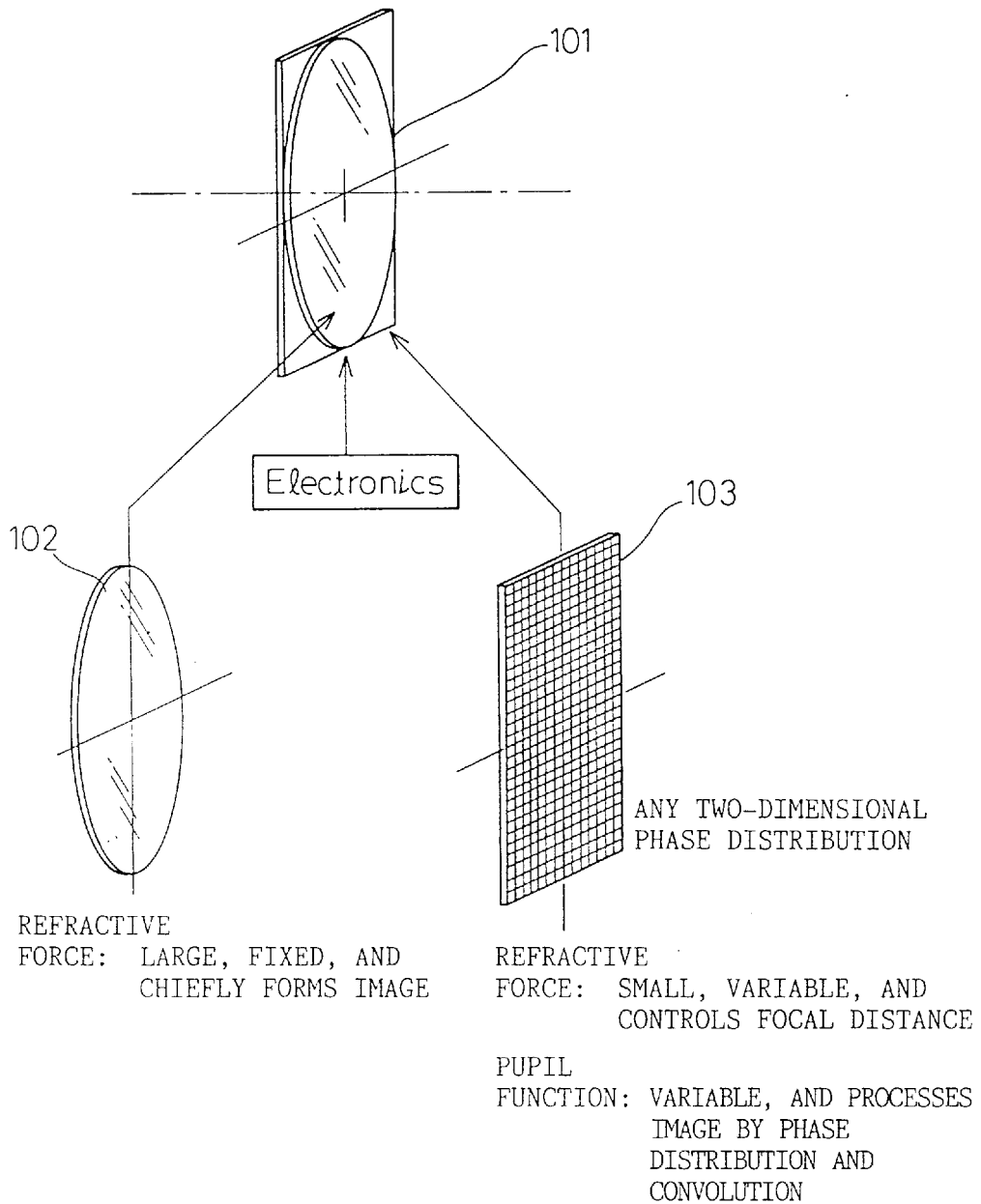

Fig.2a

ACTION IN THE VERTICAL
DIRECTION ... CONTROLS THE REFRACTIVE POWER (FOCAL DISTANCE)
ACTION IN THE LATERAL
DIRECTION ... PROCESSES IMAGE BY CONTROLLING THE PUPIL FUNCTION
  (OUTGOING IMAGE) = (INCIDENT IMAGE) * F (PUPIL FUNCTION)
                                         └─FOURIER TRANSFORM
                                    └──────CONVOLUTION

LIQUID CRYSTAL ACTIVE LENS

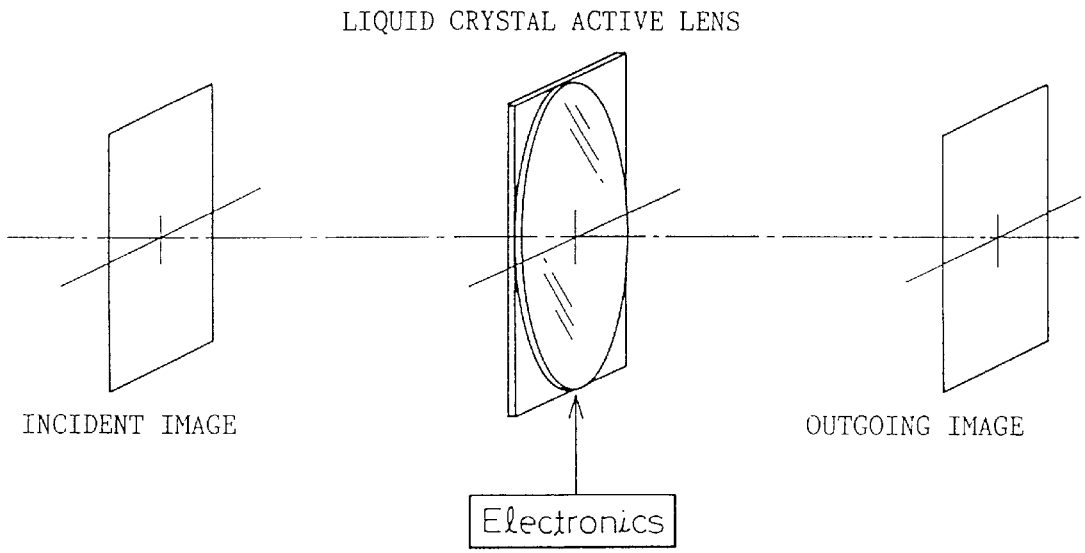

INCIDENT IMAGE          OUTGOING IMAGE

Electronics

PHASE DISTRIBUTION ON A
LIQUID CRYSTAL PANEL:  $\phi = \phi L + \phi T$
   $\phi L$: PHASE DISTRIBUTION CORRESPONDING TO THE ACTION IN
         THE VERTICAL DIRECTION
   $\phi T$: PHASE DISTRIBUTION CORRESPONDING TO THE ACTION IN
         THE LATERAL DIRECTION INCIDENT IMAGE g(x0, y0)

LIQUID CRYSTAL ACTIVE LENS

OUTGOING IMAGE u(xi, yi)

PHASE DISTRIBUTION φ(x1, y1) OF PHASE-MODULATED LIQUID CRYSTAL PANEL

FOCAL DISTANCE $f_R$

PIXEL PITCH a    SIZE b OF PIXEL

NUMBER OF PIXELS N × N $$u(xi, yi) = g(x0, y0) * F[\exp\{i\phi_S(x1, y1)\}]$$

- $u(xi, yi)$ → OUTGOING IMAGE
- $g(x0, y0)$ → INCIDENT IMAGE
- $*$ → CONVOLUTION
- $F[\exp\{i\phi_S(x1, y1)\}]$ → PHASE DISTRIBUTION SAMPLED BY THE LIQUID CRYSTAL PANEL IF $F[\exp\{i\phi_S(x1, y1)\}]$ IS DIAGRAMED, -PRIMARY COMPONENT (SPURIOUS COMPONENT)  0-ORDER COMPONENT (MAIN COMPONENT)  +PRIMARY COMPONENT (SPURIOUS COMPONENT)

RESOLUSION LIMIT

Fig.3b-1

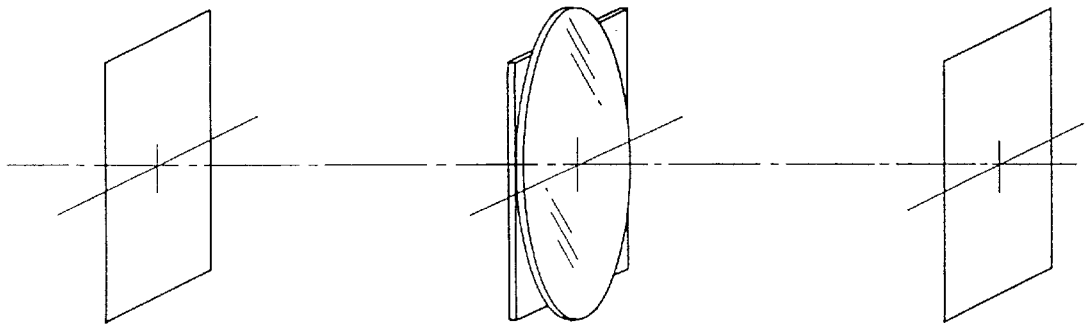

INCIDENT IMAGE $g(x,y)$

PHASE DISTRIBUTION $p(x,y)$
$P(x,y) = F\{p(x,y)\}$
$u(x,y) = g(x,y) \otimes P(x,y)$ OUTGOING IMAGE $u(x,y)$

SMALLER AND POSITIONING IS EASIER THAN GENERAL SPACE FILTERING OPTICAL SYSTEM

Fig.3b-2

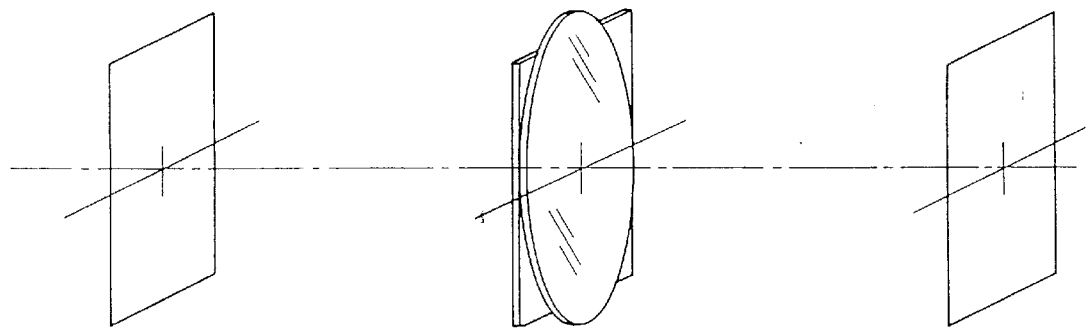

INCIDENT IMAGE
$\ell_i(x,y) = |g(x,y)|^2$

PHASE DISTRIBUTION $p(x,y)$
$\ell_p = |P(x,y)|^2$

OUTGOING IMAGE
$\ell_o(x,y) = |u(x,y)|^2$ $\ell_o(x,y) = \ell_i(x,y) \otimes \ell_p(x,y)$

MATCHES THE CONVENTIONAL IMAGE-FORMING SYSTEM WELL

Fig.3c-1
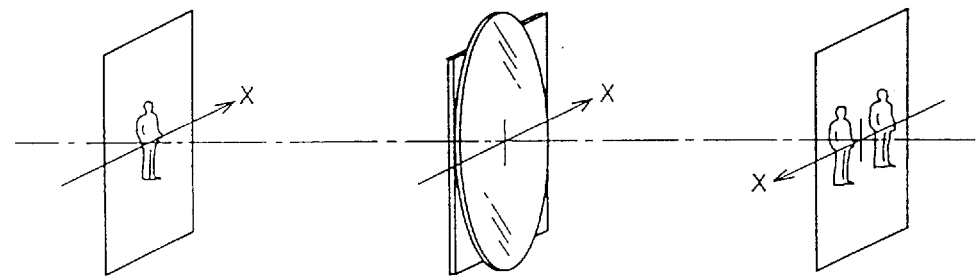
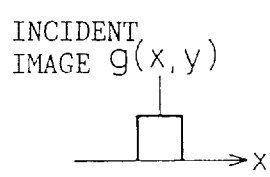
INCIDENT
IMAGE $g(x,y)$
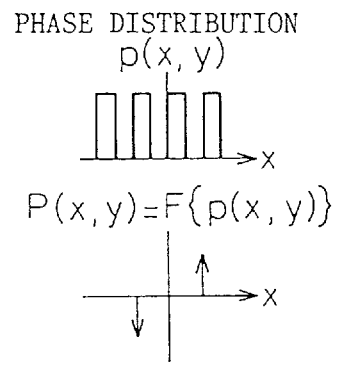
PHASE DISTRIBUTION
$p(x,y)$
$P(x,y) = F\{p(x,y)\}$
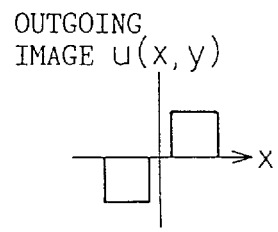
OUTGOING
IMAGE $u(x,y)$
Fig.3c-2
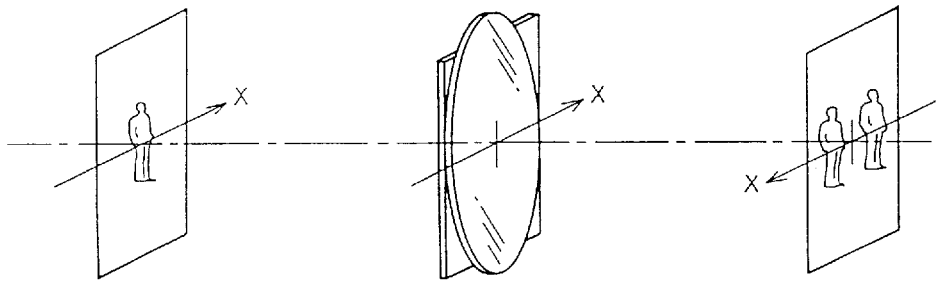
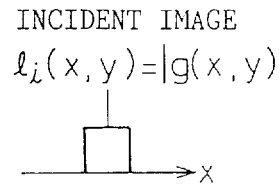
INCIDENT IMAGE
$l_i(x,y) = |g(x,y)|^2$
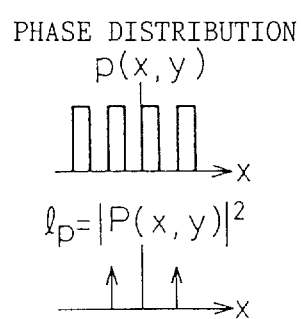
PHASE DISTRIBUTION
$p(x,y)$
$l_p = |P(x,y)|^2$
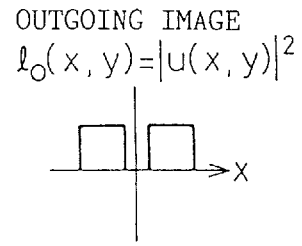
OUTGOING IMAGE
$l_o(x,y) = |u(x,y)|^2$

Fig.3d-1
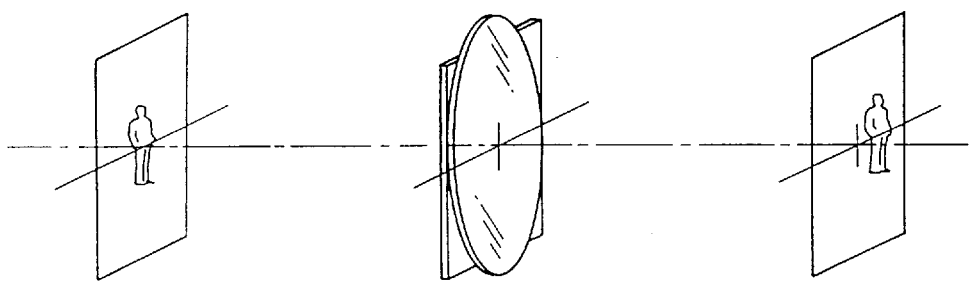
INCIDENT IMAGE
$\ell_i(x,y) = |g(x,y)|^2$
PHASE DISTRIBUTION
$p(x,y)$
OUTGOING IMAGE
$\ell_o(x,y) = |u(x,y)|^2$
$\ell_p = |P(x,y)|^2$
Fig.3d-2
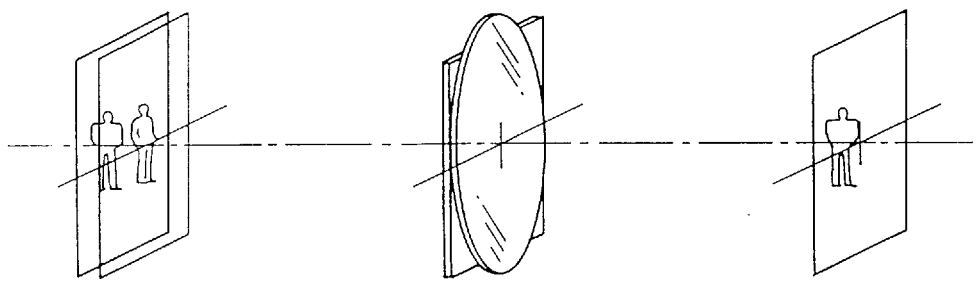
INCIDENT IMAGE
PHASE DISTRIBUTION
$p(x,y)$
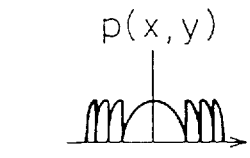
OUTGOING IMAGE

| INCIDENT IMAGE | PHASE DISTRIBUTION | OUTGOING IMAGE |
|---|---|---|
| $l_i(x,y) = \|g(x,y)\|^2$ | $p(x,y)$ | $l_o(x,y) = \|u(x,y)\|^2$ |
| b  a | $A^*$ | c⊗a  d⊗a |
| d  c | $l_p = \|P(x,y)\|^2$ | a⊗a  b⊗a |
|  | $a^*$ |  |

INCIDENT IMAGE      PHASE DISTRIBUTION      OUTGOING IMAGE
                         $p(x,y)$

INCIDENT IMAGE  
$\ell_i(x,y) = |g(x,y)|^2$

PHASE DISTRIBUTION  
$p(x,y)$

OUTGOING IMAGE  
$\ell_o(x,y) = |u(x,y)|^2$

INCIDENT IMAGE

PHASE DISTRIBUTION  
$p(x,y)$

OUTGOING IMAGE

INPUT            OUTPUT

INCIDENT IMAGE                    OUTGOING IMAGE

SOLID DYNAMIC IMAGE

RANGE IN WHICH THE FOCAL DISTANCE $f_D$ OF THE DIFFRACTION-TYPE LENS OF THE LIQUID CRYSTAL PANEL CAN BE VARIED ($\lambda$ = 550 mm)

RANGE IN WHICH THE RESULTANT FOCAL DISTANCE OF THE LIQUID CRYSTAL ACTIVE LENS CAN BE VARIED (N = 500)

NEMATIC LIQUID CRYSTALS
ORIENTED IN PARALLEL

INCIDENT IMAGE    FOURIER TRANSFORM    OUTGOING IMAGE
                  OF PUPIL FUNCTION

STRUCTURE OF
HUMAN EYE

COMPOUND EYE/OCELLUS LENS

OPTICAL DEVICE CONTAINING A LIQUID CRYSTAL ELEMENT FOR CHANGING OPTICAL CHARACTERISTICS OF A LENS ELEMENT

This application is a continuation of application Ser. No. 08/343,507 filed Nov. 29, 1994, now abandoned which is a 371 of PCT/JP94/00542 filed Mar. 31, 1994 published as WO94/23329, Oct. 13, 1994.

TECHNICAL FIELD

The present invention relates to an optical device that can be electronically controlled. More specifically, the invention relates to a structure for realizing a mechanism that electrically controls the characteristics of an optical device by controlling the phase of fine liquid crystal elements.

BACKGROUND ART

The characteristics of an optical device have heretofore been controlled by changing the mechanical relationships in a structure which is made up of a combination of a plurality of glass lenses having predetermined optical characteristics. Though the characteristics could be excellently controlled, the mechanical structure of the device invites play due to aging, permits oil to freeze when used in very cold areas and is further accompanied by an increase in the weight and volume.

In recent years, liquid crystal elements have been developed for display purposes and efforts have been made to utilize the diffractive anisotropy of liquid crystal molecules for developing the action of a prism or a lens without, however, actually accomplishing effects sufficient for use as an optical component since the liquid crystal layer is too thin for folding light and the molecules are not uniformly oriented when the thickness of the layer increases. There has not yet been discovered a method of controlling optical characteristics by using liquid crystals to a degree sufficient for practical use.

DISCLOSURE OF THE INVENTION

The present invention is intended to solve the above-mentioned problems inherent in the prior art and to provide an electrically controlled optical device having the technical constitution described below. That is, it is an electrically controlled optical device which comprises a plurality of fine liquid crystal elements that are two-dimensionally arranged, a plurality of timing electrodes for time-divisionally driving pixels each of which comprises one of the elements and a plurality of data electrodes, wherein a phase modulation element of the time-divisionally driven fine pixels for modulating the phase of wave motion of transmitted light is optically coupled to a lens that has a positive or a negative power.

BRIEF DESCRIPTION OF DRAWINGS

FIG. 1 illustrates the constitution of a liquid crystal active lens of the present invention, wherein reference numeral 101 is a liquid crystal active lens of a combination, 102 denotes a lens of a fixed focal point having a large index of refraction, and 103 denotes a phase modulation element of fine liquid crystal pixels arranged in the form of a matrix;

FIG. 2a illustrates the action of the liquid crystal active lens of the present invention;

FIGS. 2b-1, 2b-2 and 2b-3 illustrate parameters of the liquid crystal active lens of the present invention;

FIGS. 3a-1, 3a-2 and 3a-3 illustrate the relationships between the incident image, the phase distribution sampled by the liquid crystal panel and the outgoing image according to the present invention;

FIGS. 3b-1 and 3b-2 illustrate the incident image, the outgoing image, and the phase distribution of the liquid crystal panel according to the present invention;

FIGS. 3c-1 and 3c-2 illustrate the incident image, the outgoing image and the phase distribution of the liquid crystal panel according to the present invention;

FIGS. 3d-1 and 3d-2 illustrate the incident image, the outgoing image moved in the lateral direction, the motion of the image-forming point in the direction of the optical axis, and the phase distribution of the liquid crystal panel according to the present invention;

FIGS. 3e-1 and 3e-2 illustrate the incident image, the pattern matching, the outgoing image that is emphasized, and the phase distribution of the liquid crystal panel according to the present invention;

FIGS. 3f-1 and 3f-2 illustrate the incident image, the special effect, the outgoing image after aberration is corrected, and the phase distribution of the liquid crystal panel according to the present invention;

FIGS. 3g-1 to 3g-4 illustrate the incident image, the outgoing image of neural network and optical interconnection, and the phase distribution of the liquid crystal panel according to the present invention;

FIGS. 3h-1 and 3h-2 illustrate the incident image, the picking-up of the contour, the outgoing image of the solid dynamic image of a hologram and the phase distribution of liquid crystal panel according to the present invention;

FIGS. 3i-1 to 3i-4 illustrate the incident image, the correction of color aberration, color separation, the outgoing image of color time-divisional separation, and the phase distribution of liquid crystal panel according to the present invention;

FIG. 4 illustrates a relationship between the pitch of the liquid crystal pixels of the liquid crystal active lens and the image size according to the present invention;

FIG. 16 illustrates the liquid crystal active lenses according to embodiments of the present invention, wherein

BEST MODE FOR CARRYING OUT THE INVENTION

An embodiment of an electrically controlled optical device according to the present invention will now be described in detail with reference to the drawings.

The present inventors have studied the cause of the lack of effect in the optical component and have come across a problem of power. As a result, it was found and confirmed that an electronically controlled optical element could be realized by serving conventional optical element as a power producing device and causing a liquid crystal element to share a adjustment component which is important for the optical element. The contents of the present invention will now be described with reference to the drawings.

Figures 1, 2B:
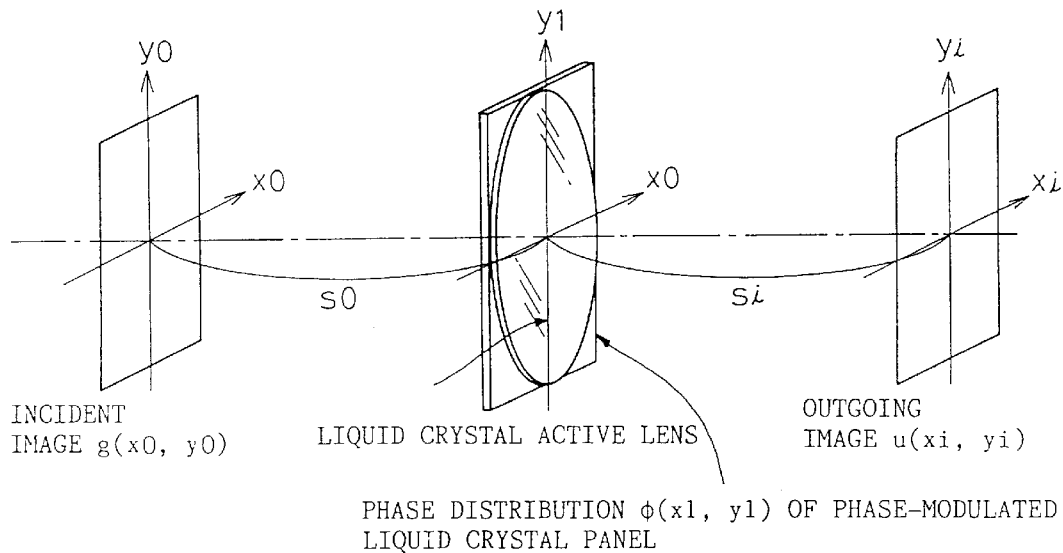

FIG. 1 illustrates the fundamental constitution of the present invention wherein a lens 102 and a liquid crystal element 103 are stuck together. The liquid crystal element is constituted by fine pixels which work independently to control the phase delay formed in transmitted light depending upon the applied voltage. The liquid crystal element may be a parallel-oriented nematic liquid crystal element, or a nematic liquid crystal element having a twisted structure, for example. A liquid crystal element plate is at right angles to the optical axis of the lens and electronically realizes a two-dimensional phase distribution thereinto. FIGS. 2a and 2b illustrate the operation of an optical system according to the present invention. Here, an element obtained by sticking together a conventional lens having power and a two-dimensional phase modulation liquid crystal element is called liquid crystal active lens. The incident image $g(x_0, y_0)$ is a matrix. The outgoing image $u(x_i, y_i)$ is expressed by the following equation.

As is known, the liquid crystal molecule can be shaped like a rugby ball, and have different transmission rates in its longitudinal and transverse directions. Accordingly, a phase delay occurs between these directions when the light is transmitted therethrough. For example, in a liquid crystal layer 10 micrometers thick, the orientation of the molecule with respect to the layer surface can be controlled as a function of the position on the surface of the liquid crystal layer so that the wavefront of the transmitted light can be phase-modulated as a function of the position, and the thickness of the glass (10 $\mu$m) can be changed as a function of the position of the surface of the glass.

On the other hand, as is known, there is a close relationship between the dielectric constant and the refractive index. That is, the higher the refractive index, the higher the dielectric constant. Liquid crystal molecules are oriented in accordance with the direction of the electric field in the high electric field. As a result, when the electric field distribution is provided to the liquid crystal layer, it is possible to provide a distribution of the refractive index in accordance with the electric field distribution on the surface of the liquid crystal layer.

Further, the transmission rate of the light is delayed in the portion of the liquid crystal layer with a higher refractive index. When the light first transmitted (irradiated perpendicular to the liquid crystal surface) through the liquid crystal layer is taken as a reference light, at that time, other light can be transmitted through a different portion existing within the liquid crystal layer so that the difference of the time transmitted within the layer causes a phase delay (delay time of phase). Further, if the delay time is divided by the wavelength of the light, and the result is multiplied by $2\pi$, it is possible to obtain the amount of phase delay. As a result, the wavefront of the light, which is controlled by the electric field and transmitted through the liquid crystal layer, structures the phase distribution in accordance with the distribution of the refraction of the light Based on the above principle, when a transparent electrode is formed on each sheet of transparent glass (the two sheets are opposite to each other) and a different voltage is supplied to each glass, it is possible to produce a distribution of the phase delay for the wave surface of the light as a function of the position. As is well known, the orientation of the liquid crystal molecule is switched in response to the alternating electric field (root-mean-square (r.m.s.)). That is, pixels are driven by the alternating electric field. The above principle is known as time-sharing driving of the Twisted Nematic type liquid crystal.

In the following equation, a mark ^ is used for expressing power; e.g., A ^3 expresses third power of A. An affixed letter is expressed in by half size characters.

$u(xi, yi)=g(xo, yo)*F[exp\{i\phi s(x1, y1)\}]$. Eq. 1
where $\phi s(x1, y1)$ denotes the phase distribution sampled by the liquid crystal element panel, and * denotes a mathematical convolution.
Furthermore,
$[exp\{i\phi s(x1, y1)\}]=[exp\{i\phi s(x1/a, x1/a)\}]$ -continued

```
    *rect(x1/b, yi/b)]
    rect(xi/b, yi/b)...     Eq. 2
where *rect(x1/b, y1/b)]
    rect(x1/b, y1/b)
```
are terms representing the sampling.
Furthermore,
```
F[exp(iφs(x1, y1)]
=a^4b^2N^2[F[exp{φ(x1, y1)}]
    *comb (avx, avy)]
    sinc(bvx, bvy)]
    *sinc(aNvx, bNvvy)       ... Eq. 3
where
vx=xi/λsi,
vy=yi/λsi
```
and v denotes the wavelength of light.

Figures 2, 2B:
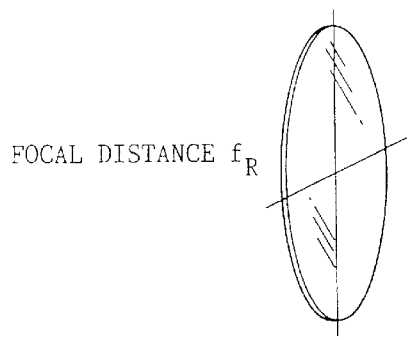
Figures 2, 2B, 3:
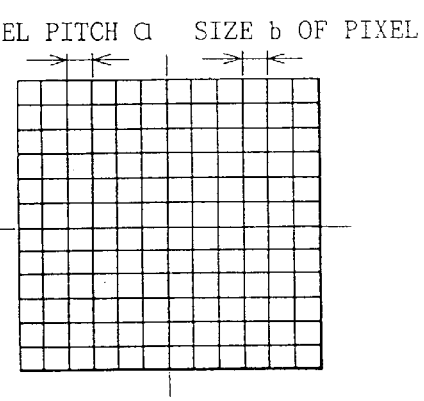
Figures 1, 3A:
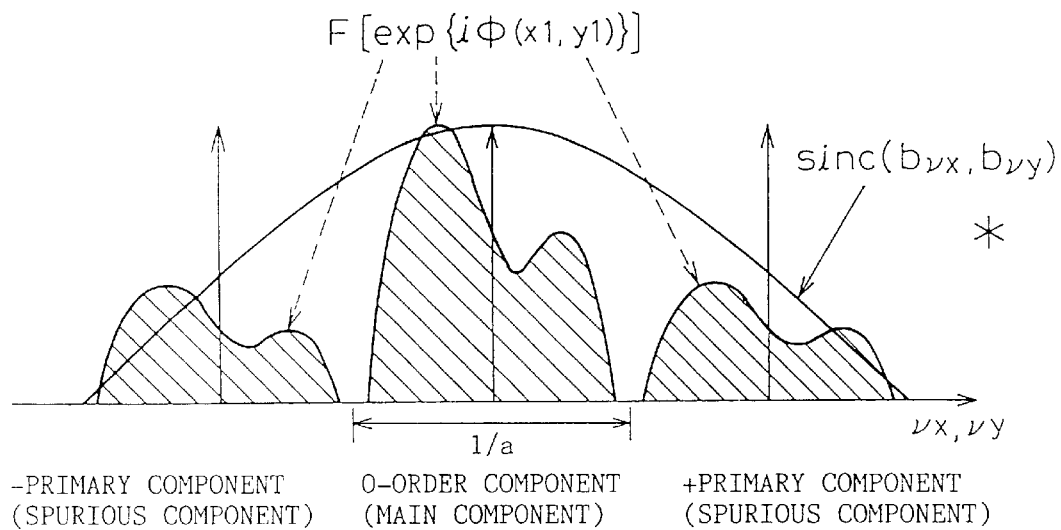
Figures 2, 3A:
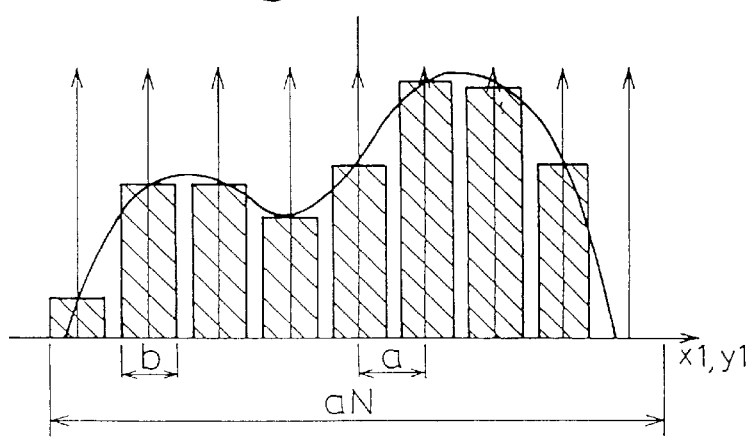
Figures 3, 3A:
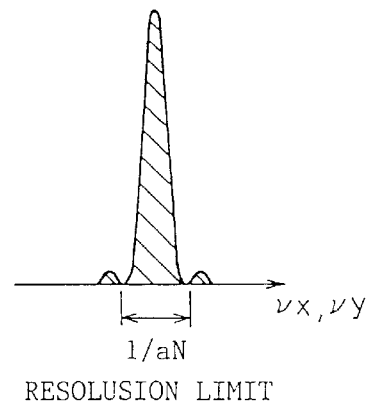

$F[\exp\{\phi(x1, y1)\}]$ can be diagrammed as shown in FIGS. 3a-1 and 3a-2, and high-order spurious components are formed so as to distribute beside the zero-order component. The sampling imposes the following limitations on the image, Image size: $(\lambda si/a) \times (\lambda si/a)$ Number of resolving points: N×N Brightness: $\alpha a^4 b^2 N^2 a^2$ S/N: $1/\{snc(b/wa)\}^2$ In FIG. 3a-1, the phase distribution sampled in the liquid crystal panel is expressed by three components shown by slanted lines. "Zero-order" is the main component of the distribution, and the high-order components are undesirable. FIG. 3a-2 shows the detailed phase distribution to explain sampling intervals "a" and "b". FIG. 3a-3 shows the resolution limit of the sampling of the phase distribution. The limit is given by 1/aN (see FIG. 3a-2).

The space modulation element and its operation are shown in FIGS. 3b-1 and 3b-2.

FIGS. 3c-1 and 3c-2 illustrate a case where the outgoing image is moved in a lateral direction on a plane that intersects the optical axis at right angles. In this case, a group of liquid crystal pixels constitute a mosaic prism. When a focal distance is adjusted, furthermore, these pixels constitute a mosaic Fresnel lens.

FIG. 3c-1 shows the situation where the phase distribution P(x,y) is provided for the opposite side of the x-axis of the diffraction grating for the phase modulated elements (see the direction of arrows of P(x,y)), and the outgoing image u(x, y) is also provided for the opposite side of the x-axis. On the other hand, FIG. 3c-2 shows the case that the phase distribution P(x,y) is provided for the same side of the x-axis (see direction of arrows of P(x,y)). Accordingly, these drawings show the phase relationships between the incident image g(x,y) and the outgoing image u(x,y) based on the phase distribution.

FIG. 3d-1 shows the situation where, as shown in the phase distribution P(x,y), a phase of the liquid crystal lattice is repeatedly increased in accordance with a predetermined slope in the x-direction in a prism-like waveform (or sawtooth waveform). In this case, the image formation can be moved in accordance with the slope. In this situation, since there is no difference between phases if the phase is cut away in the 2π-mode, there is no problem when the phase difference is in the 2π-mode if the phase delay occurs on the x-axis in the prism-like waveform. Further, the prism angle can be controlled in accordance with the electric field.

Figures 1, 3E:
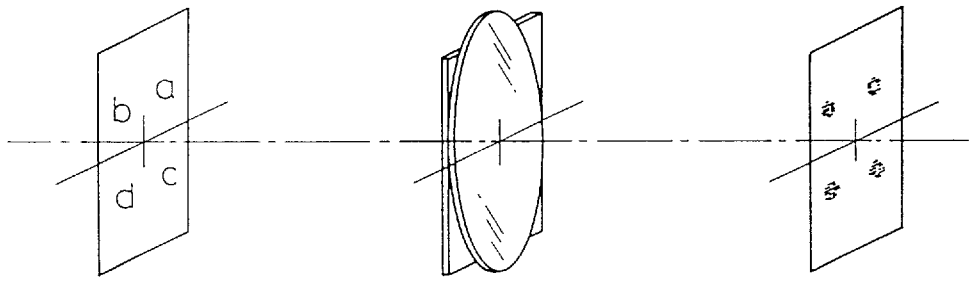
Figures 2, 3E:
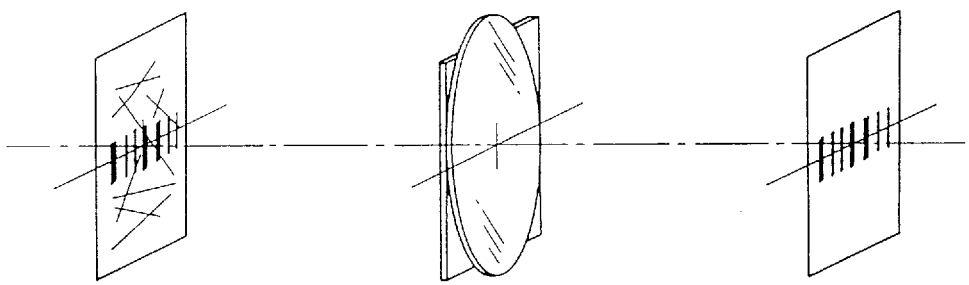

FIG. 3d-2 shows the situation where the slope of the amount of the phase shown in FIG. 3d-1 is changed in accordance with the function of the position on the x-axis. As is shown in the phase distribution, this constitutes the Fresnel lens controlled by the electric field. The amount of phase jump on the x-axis is given by 2π. FIGS. 3e-1 and 3e-2 illustrate the constitution of a matched filter, and a light spot shines bright at a position of the closest pattern as a result of a convolution operation. Similarly, it is possible to pick up a signal image buried in the noise by using an amplitude modulation element of the time-division driven fine liquid crystal pixels for, which removes or suppresses optical noise components.

FIG. 3e-1 shows the situation where the phase pattern is formed on the surface of the phase modulation so that the image information can be expressed by the result of a convolution calculation for the original image and the phase pattern. As a result, it is possible to perform yes/no recognition of the phase pattern.

FIG. 3e-2 shows the situation where it is possible to delete the noise components of the image by utilizing the above method of the above item (see in FIG. 3e-1).

Figures 1, 3F:
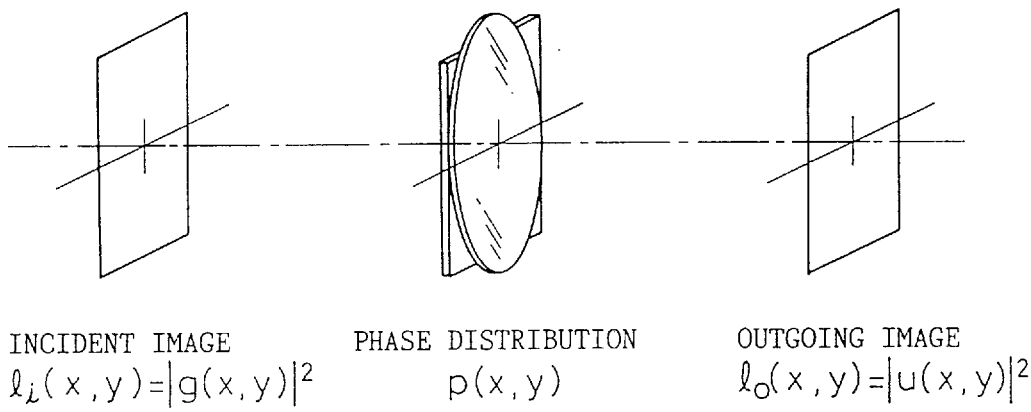
Figures 2, 3F:
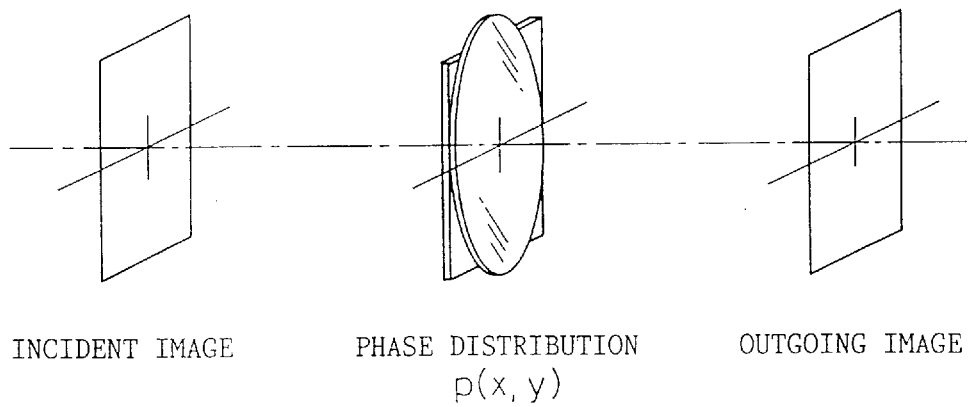

FIGS. 3f-1 and 3f-2 illustrate the case of a special effect and aberration correction. FIG. 3f-1 shows the situation of external light, and FIG. 3f-2 shows phase-continuous light. The difference between the natural light and the phase-continuous light (for example, laser) is caused by the difference of the coherence length. Further, the difference between the natural light and the phase-continuous light occurs in an evaluation of the image information.

Figures 1, 3G:
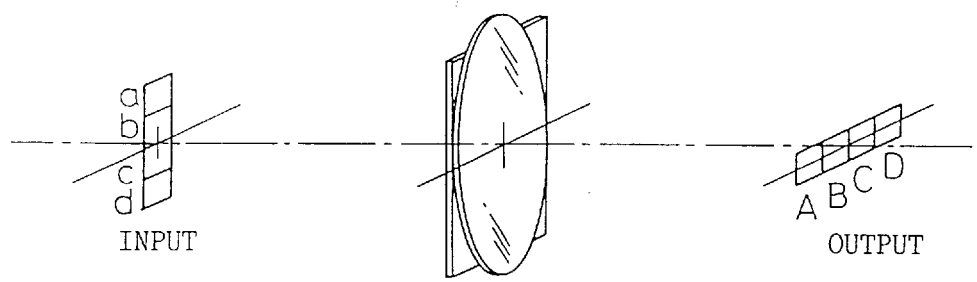
Figures 2, 3G:
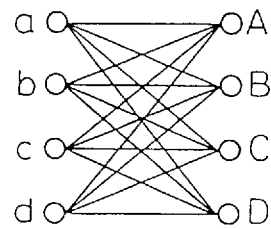
Figures 3, 3G:
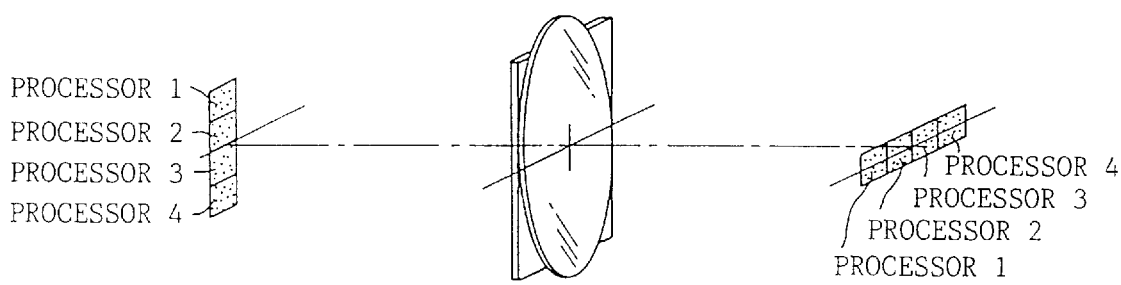

FIGS. 3g-1 to 3g-4 illustrate an optical neural network and an optical interconnection. In these cases, mosaic liquid crystal lens groups are constituted by a number of the output terminals. FIG. 3g-1 shows multipoint switching connection (or light interconnection) in which the light from the light points (input points) "a", "b", "c", and "d" is directed to the image formation points (output points) A, B, C, and D in accordance with the control of the phase plate provided therebetween.

FIG. 3g-2 shows the detailed connection configurations in FIG. 3g-1. That is, various connection configurations can be provided from one to several points (for example, from "a" to A, B, C, and D) or from several points to one point (for example, from A, B, C, and D to "d") in accordance with the function of the phase distribution of the phase plate.

Figures 3, 3G, 4:
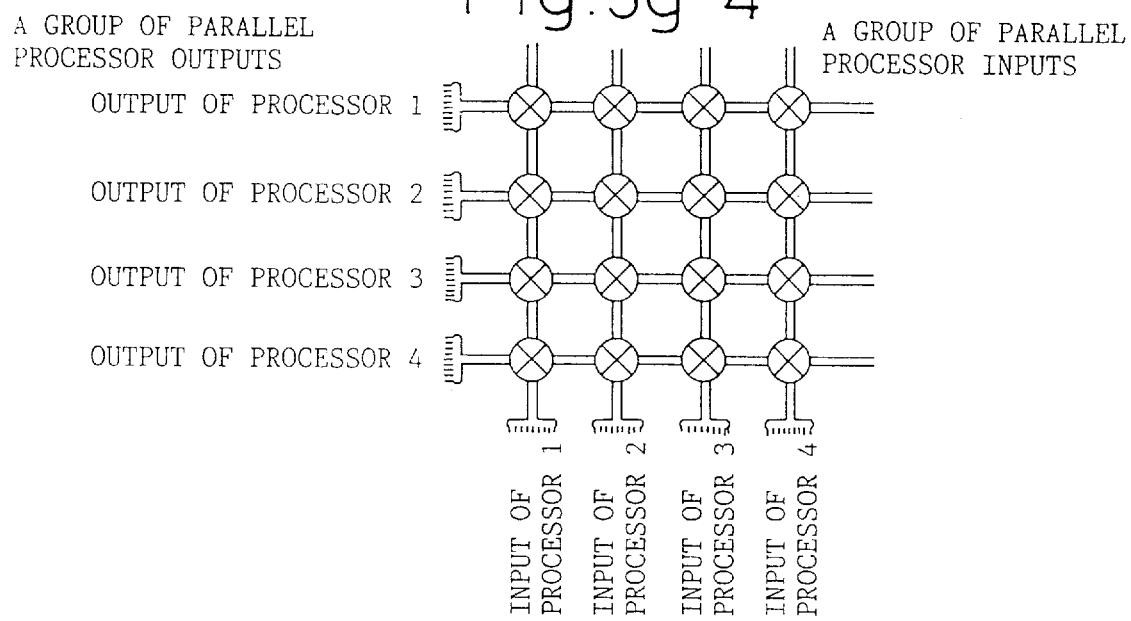

FIG. 3g-3 shows one example of an exchanger utilizing the multipoint switching connection shown in FIG. 3g-1. As is obvious, the input points "a" to "d" correspond to PROCESSORS 1 to 4, and output points A to D correspond to PROCESSORS 1 to 4. FIG. 3g-4 shows a parallel calculation apparatus formed by a plurality of processors. A plurality of phase plates are provided in a matrix for intersecting points of processors 1 to 4. The above connections utilize the image formation obtained as the result of the convolution for the light image and the electrically controlled phase plate.

Figures 1, 3H:
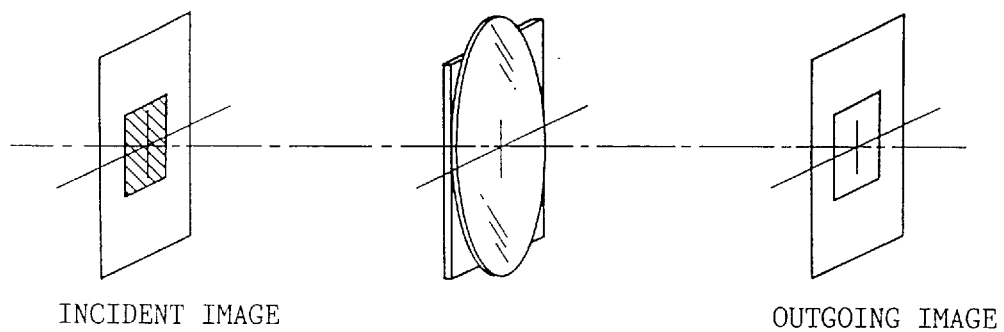
Figures 2, 3H:
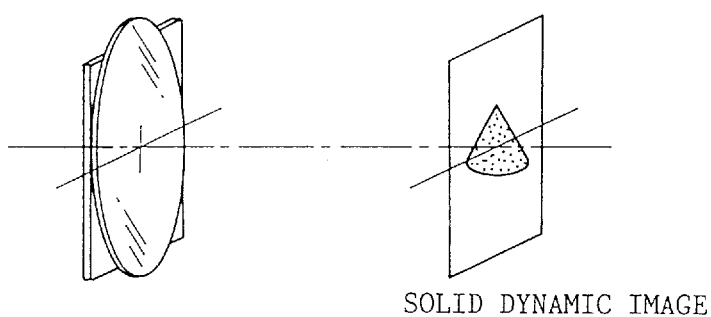
Figures 1, 3I:
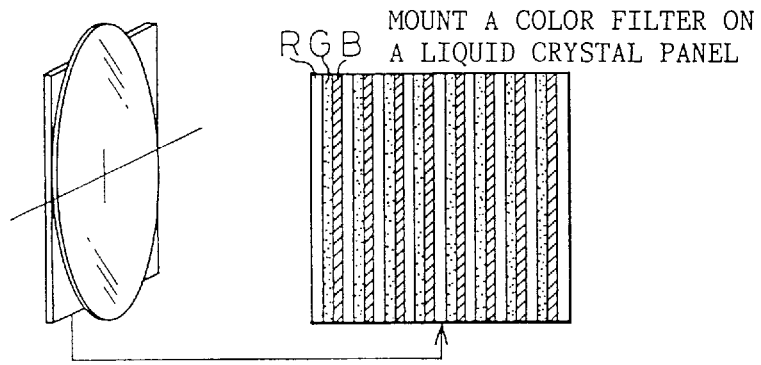
Figures 2, 3I:
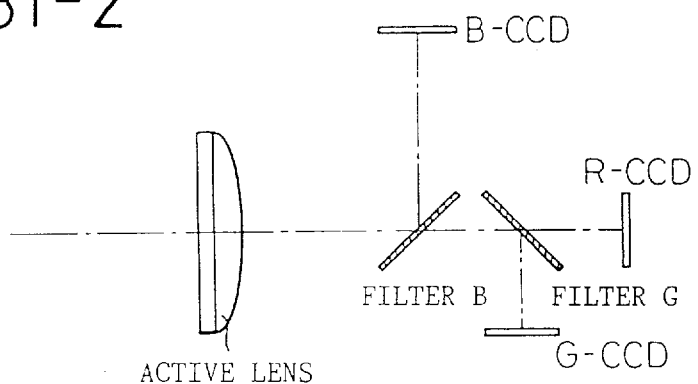
Figures 3, 3I:
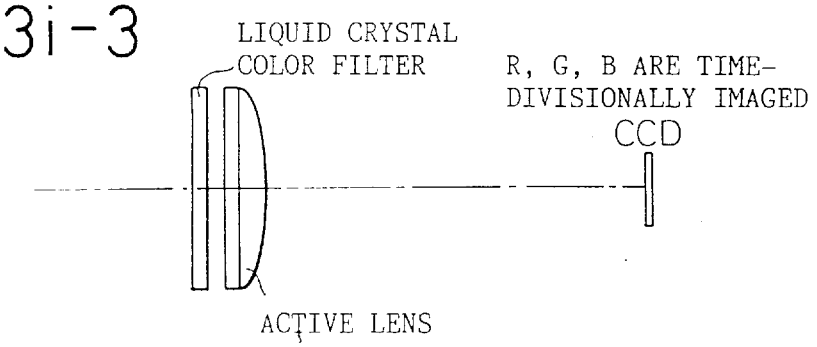
Figures 3, 3I, 4:
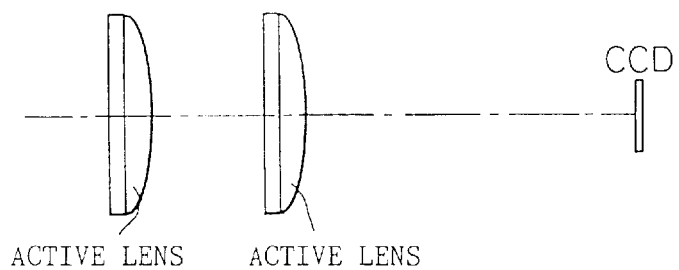
Figure 4:
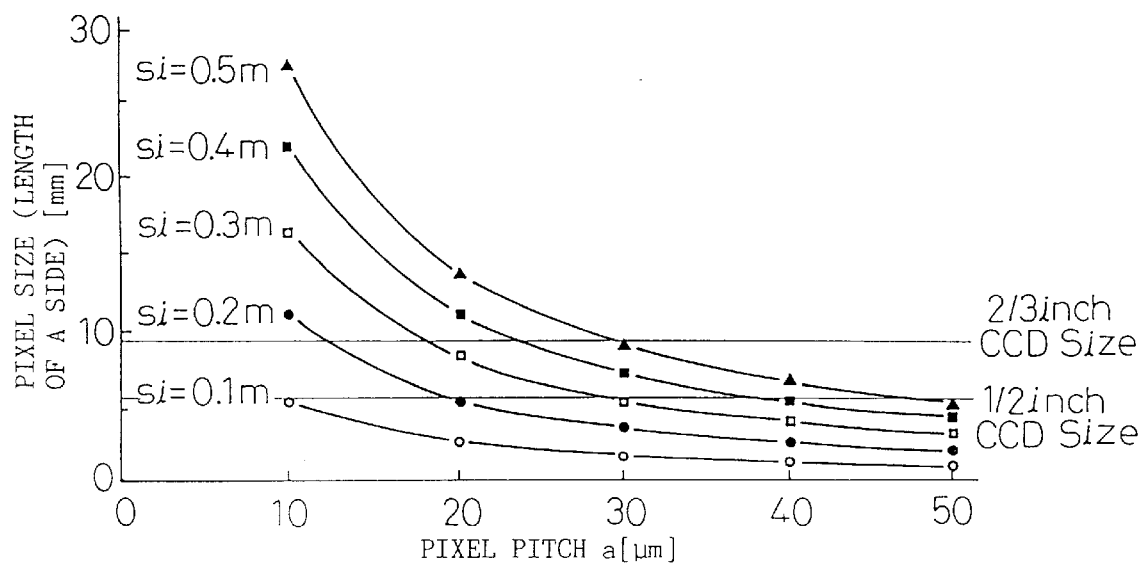

FIGS. 3h-1 and 3h-2 illustrate picking up the contour in the coherent light processing and reproduction of hologram solid dynamic image. FIG. 3h-1 shows the structure for obtaining the output image after calculation of the input image. Based on the image data having the equivalent height lines of the interference obtained by utilizing of the phase continuation, it is possible to reproduce the stereo image based on the convolution calculation utilizing the phase modulation plate shown in the drawing. Further, if the phase modulation plate is used for a holographic dry-plate, it is possible to realize the stereo still image and the stereo animated image, which can be electrically controlled, based on modulation of the phase continuous light by using the phase modulation plate. FIG. 3h-2 shows the solid dynamic image obtained by the phase modulation plate. FIGS. 3$i$-1 to 3$i$-4 illustrate combinations of mosaic color filters, i.e., illustrate examples where an input image is separated into three colors of red, green and blue in space and in time and examples of achromatic active lenses. FIG. 3$i$-1 shows the liquid crystal plate structured so as to form the mosaic phase modulation plate having primaries (three basic colors) by laminating color filters. According to this structure, it is possible to realize the space phase modulation elements for the color image. FIG. 3$i$-2 shows a three-plate type color imaging system which forms the color image by utilizing three CCDs each having a single color R, G, and B. FIG. 3$i$-3 shows that the liquid crystal modulation elements are derived based on time-sharing drive for each color so that the color image is obtained by operating one CCD in the time-sharing drive. FIG. 3$i$-4 shows the electrically controlled optical apparatus which can cover a broader range in accordance with sets of phase modulation elements having plural active lenses.

TABLE 1

| Pixel pitch | Image distance s1 (cm) | | | | |
|---|---|---|---|---|---|
| a($\mu$m) | 10 | 20 | 30 | 40 | 50 |
| 10 | 5.50 | 11.0 | 16.5 | 22.0 | 27.5 |
| 20 | 2.75 | 5.50 | 8.25 | 11.0 | 13.8 |
| 30 | 1.83 | 3.61 | 5.50 | 7.33 | 9.17 |
| 40 | 1.38 | 2.75 | 4.13 | 5.50 | 6.88 |
| 50 | 1.10 | 2.20 | 3.30 | 4.40 | 5.50 |

There exists a relationship between the pixel pitch and the image distance as shown in Table 1, which becomes as shown in FIG. 4.

TABLE 2

| Modulation (a/b) | S/N ratio [dB] | Brightness (relative value) |
|---|---|---|
| 0.1 | 1.13 | 0.287 | 0.01 |
| 0.2 | 1.14 | 1.16 | 0.04 |
| 0.3 | 1.36 | 2.65 | 0.09 |
| 0.4 | 1.75 | 4.84 | 0.16 |
| 0.5 | 2.47 | 7.84 | 0.25 |
| 0.6 | 3.93 | 11.9 | 0.36 |
| 0.7 | 7.39 | 17.4 | 0.49 |
| 0.8 | 18.8 | 25.2 | 0.64 |
| 0.9 | 83.7 | 38.5 | 0.84 |
| 1.0 | $\infty$ | $\infty$ | 1.00 |

Figure 5:
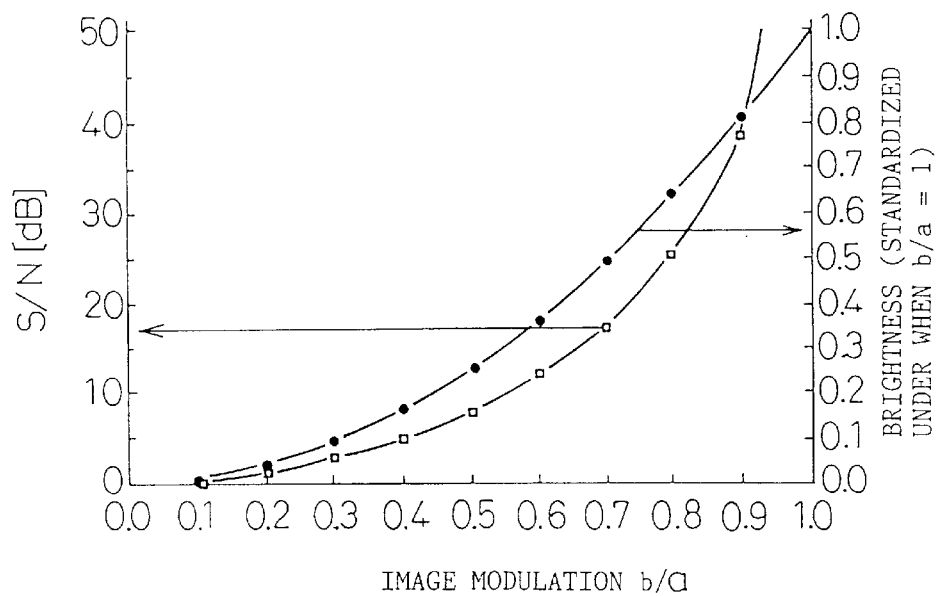
FIG. 5 illustrates a relationship between the S/N ratio (signal-to-noise ratio) of the image of the liquid crystal active lens and the modulation of the liquid crystal pixels according to the present invention.

There exists a relationship between the brightness of the image and the signal-to-noise (—S/N) ratio as shown in Table 2, which can be expressed as shown in FIG. 5.

Figure 6:
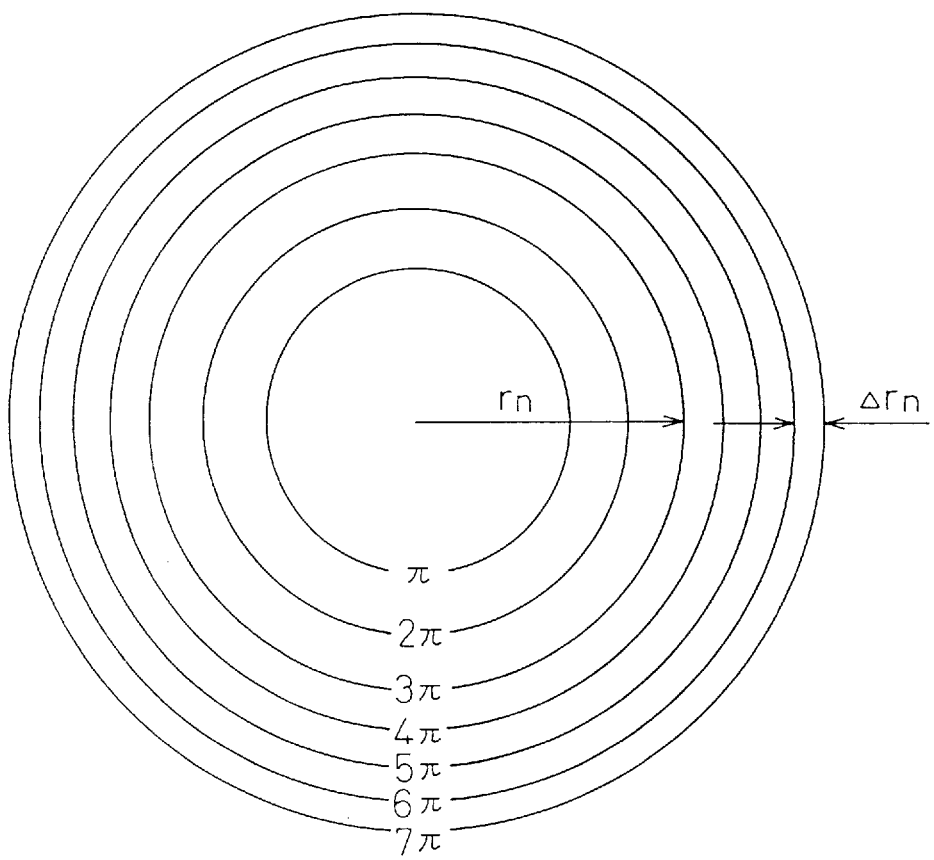
FIG. 6 illustrates a relationship between the radius and the phase distribution of a liquid crystal phase modulation pattern of the liquid crystal active lens according to the present invention.

FIG. 6 illustrates an example of the liquid crystal active lens. From the theorem of sampling, the phase distribution for obtaining a diffraction-type lens to be disposed on the liquid crystal element panel must be such that the amount of phase change of the neighboring pixel is smaller than $\pi$. If the amount of phase of the transmitted light is denoted by $\phi T$, the wavelength by $\lambda$, the radius of an n-th liquid crystal ring by rn, and the focal distance by fD, then, $$\phi T = -i(2\pi r^2/2\lambda fD)$$
$$rn = (n\lambda fD)^{(1/2)}$$
$$\Delta rn = r_{n+1} - r_n = (\lambda fD/n)^{(1/2)}/2$$

must be greater than the liquid crystal pixel pitch a.

$$\Delta rn \geq a$$

$$n \leq \lambda fD/4a^2$$

If a maximum value of n is denoted by N and a maximum radius by rN, then, $$N = \lambda fD/4a^2$$
$$rN = \lambda fD/2a$$

In order that the whole liquid crystal element panel is included, $$rn \geq aN/2$$
$$fD \geq (a^2)N/\lambda$$

In the case of a negative lens, similarly, $$fD \leq -(a^2)N/\lambda$$

A minimum focal distance fmin must satisfy the following equations, $$fD \geq fmin, \text{ and}$$
$$fD \leq -fmin$$
$$fmin = (Na^2)/\lambda$$

Figure 7:
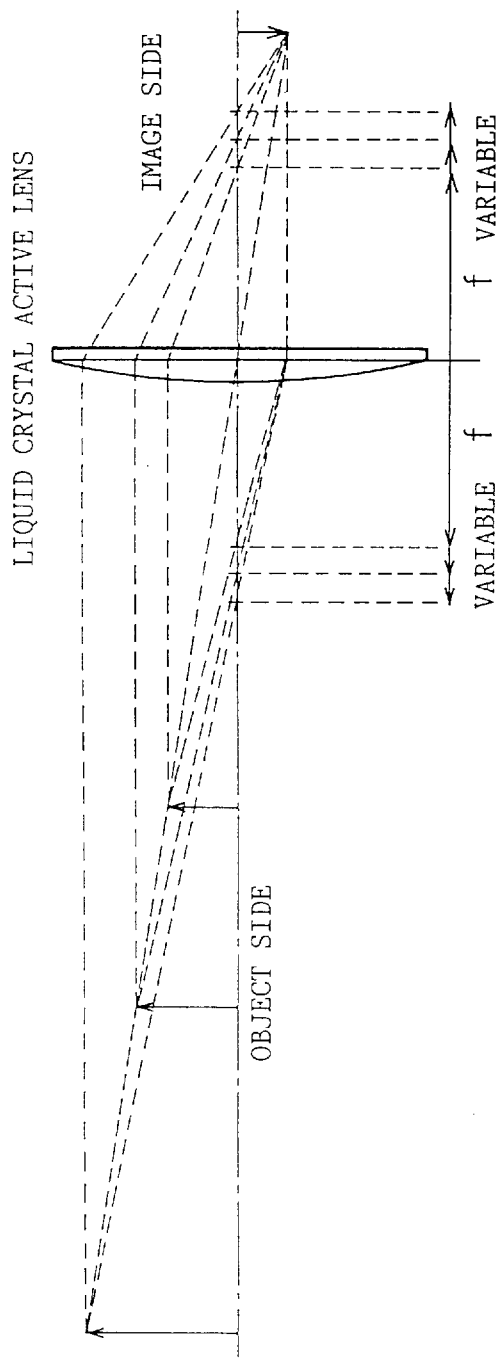
FIG. 7 illustrates a range in which the focal distance can be changed along the optical axis of the liquid crystal active lens of the present invention.
Figure 8:
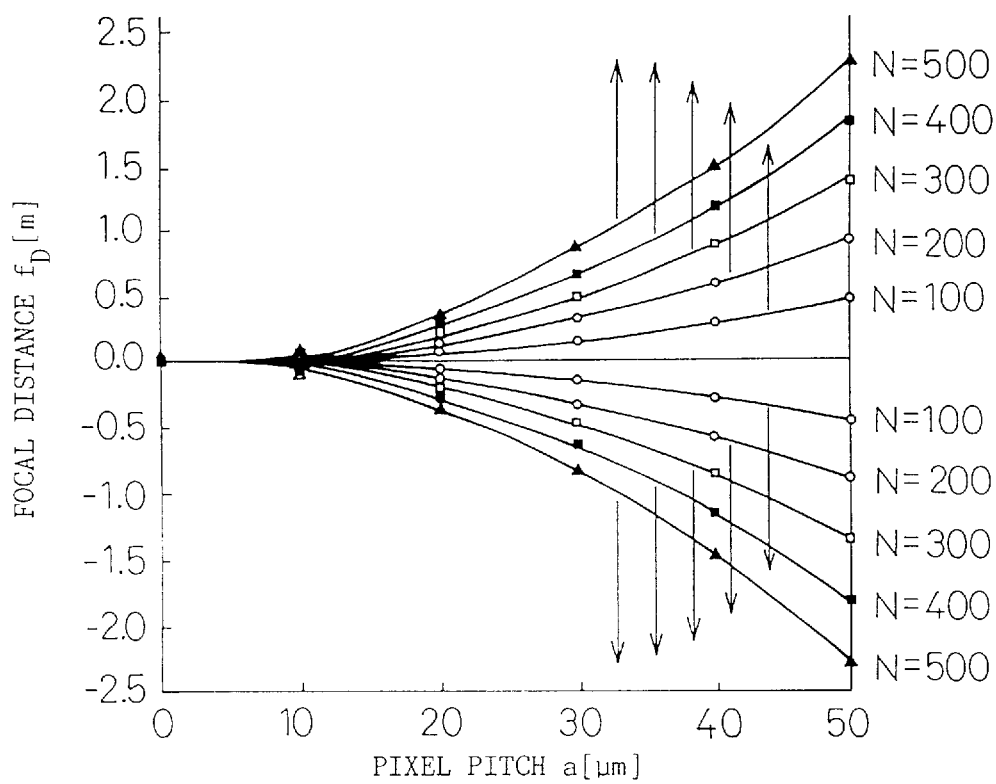
FIG. 8 illustrates a range in which the focal point $f_D$, of a diffraction-type liquid crystal lens of the present invention, can be changed.

FIG. 7 illustrates the behavior, in the direction of the optical axis of an optical system using the liquid crystal active lens. The liquid crystal active lens is combined with a conventional glass lens or a plastic lens having power, and works to change the focal distance as the liquid crystal element controls the amount of phase of the transmitted light based on a function of the distance from the center as described above. This can be expressed as a function of the pixel pitch and the pixel number as shown in Table 3, which can then be drawn as shown in FIG. 8.

TABLE 3

| Pixel pitch | Pixel number N | | | | |
|---|---|---|---|---|---|
| a($\mu$m) | 100 | 200 | 300 | 400 | 500 |
| 10 | 0.0182 | 0.0364 | 0.0465 | 0.0723 | 0.0909 |
| 20 | 0.0727 | 0.145 | 0.218 | 0.291 | 0.364 |
| 30 | 0.164 | 0.327 | 0.491 | 0.665 | 0.818 |
| 40 | 0.291 | 0.582 | 0.873 | 1.16 | 1.45 |
| 50 | 0.455 | 0.909 | 1.36 | 1.82 | 2.27 |

If the resultant focal distance is denoted by f, the focal distance of a conventional fixed lens by fR, and the focal distance of a thin lens of a liquid crystal element having a small power by fD, then, $$f = fR \cdot fD/(fR + fD)$$

Figure 9:
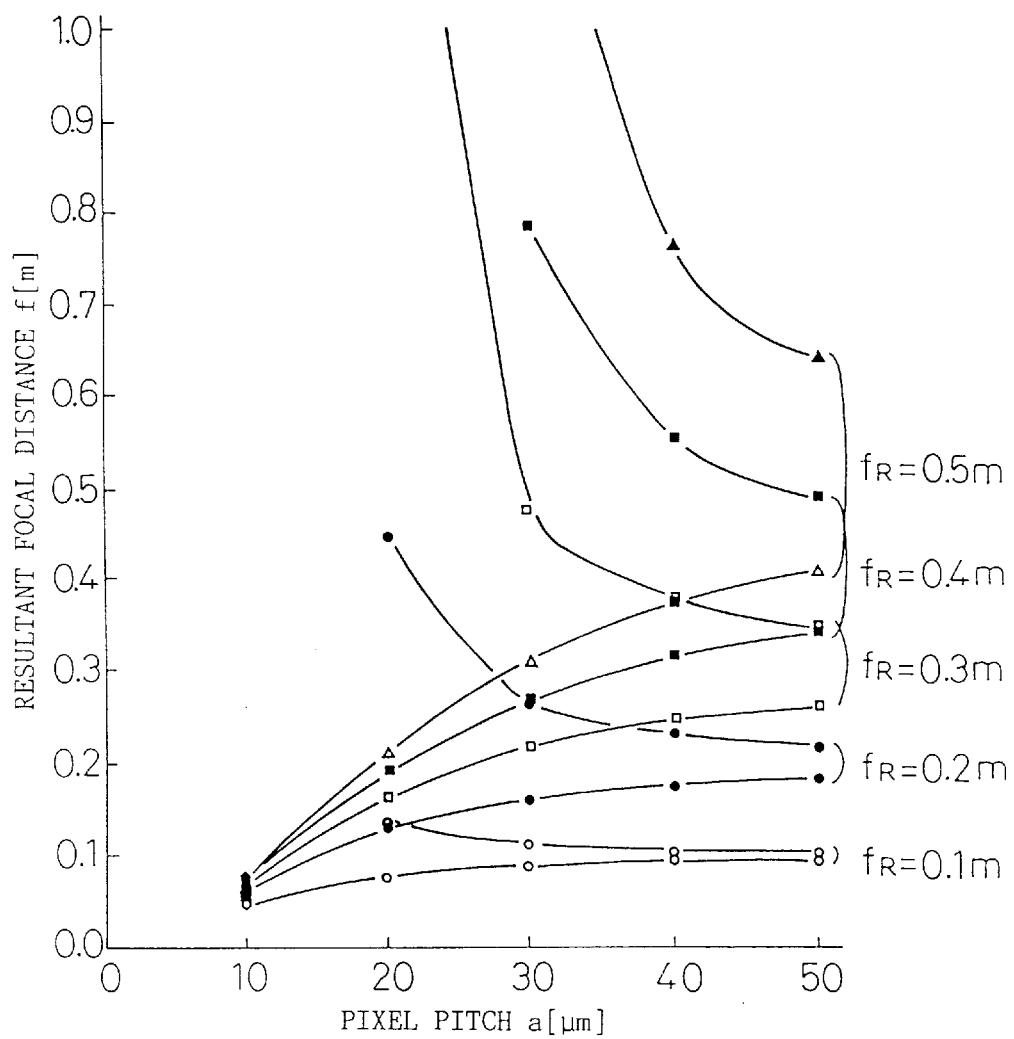
FIG. 9 illustrates a range in which the resultant focal point of a composite lens of a combination of a diffraction-type liquid crystal lens and a lens having a large index of refraction of the present invention, can be changed.

FIG. 9 illustrates the resultant focal distance in the case when the number of pixels is 500, from which it will be understood that there is obtained a range for varying the focal point from 10 cm to several meters by combining the lens with a glass lens having a focal distance of several tens of centimeters. Simply put, a Fresnel lens having a small power that can be electrically controlled is formed by using a liquid crystal element of fine pixels, and is stuck to a lens of a large power having a fixed focal point maintaining a predetermined distance, in order to constitute a variable lens which, as a whole can be electrically controlled.

Similarly, it is possible to utilize the action of the liquid crystal active lens in the lateral direction. The resultant focal distance of the whole device is changed to electronically control the image formation. If the aforementioned equation 1 is described again by using an incident image g, an outgoing image u and pupil function (exp{iφs (x1, y1)}, then, $$u(xi, yi) = g(x0, y0) * F[exp\{i\phi s(x1, y1)\}]  \quad \text{Eq. 1}$$

in the case of a coherent beam, and $$|u(xi, yi)|^2 = |g(x0, y0)|^2 * |F[exp\{i\phi s(x1, y1)\}]|^2$$

in the case of an incoherent beam.

The image F[exp{iφs(x1, y1)}] which involves convolution can be considered in terms of:

Size: $(\lambda si/a)^2$

Number of resolution points: N×N

The Fresnel prism is made up of a liquid crystal element and is stuck such that the position of forming the image can be moved up and down just like when the lens having large power is combined with a thin liquid crystal Fresnel lens. For instance, there exists a relationship, $$\delta - (x - \Delta x)\delta(x - \Delta y) \underset{F-1}{\overset{F}{\leftrightarrows}} \exp\{-2\pi(\Delta xvx + \Delta yvy)\}$$

If a phase distribution, $$\phi r(x1, y1) = -(2\pi r^2/\lambda si)(\Delta xv1 + \Delta yv1)$$

is used as a pupil function, then, the image can be moved in the picture.

The ranges for moving the image are, $$-(\lambda si/2ax) \leq \Delta x \leq (\lambda si/2ax)$$

$$-(\lambda si/2ay) \leq \Delta y \leq (\lambda si/2ay)$$

In the device of this embodiment, therefore, $$-3.04 \leq \Delta x \leq 3.04$$

$$-3.04 \leq \Delta y \leq 3.04$$

Relying upon this principle, the image can be moved up and down or right and left. These movements can be synthesized as a matter of course, and the position for forming an image can be freely moved on a plane perpendicular to the optical axis. By utilizing this, the image from a swinging video camera recorder can be corrected to fix the imaging point in the direction of an average optical axis of the camera. In this case, correlation to the preceding and succeeding frame image data is calculated in relation to a particular scanning line in the output of the camera to calculate a time difference in the same image that is moving, and a negative feedback is effected to move positions of objects at the right and left of the liquid crystal active lens such that the difference in time decreases. As for the swing in the up-and-down direction, a time difference in the up-and-down direction in the same image is calculated from the correlation of image information among the scanning lines in the same frame, and a negative feedback is executed such that the time difference is minimized. Less electric power is consumed than in the conventional method that effects the correction by mechanically moving the imaging element. Moreover, the image is not coarsened since information is not compressed by cutting a part of same compared with the system that corrects the apparent swinging by trimming the image so as to be shifted toward the inside of the imaging range utilizing the electrical processing.

In the case of a zoom lens mechanism, a complex mechanism is employed for moving the lens so as to maintain constant the focal position while changing the magnification of a lens system but the focal position still undergoes a small change. If this is combined with the liquid crystal active lens of the present invention, the main mechanism moves the lens having power, and the liquid crystal active lens works to correct the image-forming position and the focal position. It is further possible to realize a zoom lens system by using a single or a plurality of liquid crystal active lenses and without moving parts.

The greatest feature of the liquid crystal active lens is to realize a non-spherical lens and an electrically controlled astigmatic lens for correction. In correcting a complex astigmatic optical system, in particular, the liquid crystal active lens makes it possible to effect an individual correction that was previously impossible.

By applying signals to the liquid crystal to effect a control which consists of controlling the image-forming position in the direction of the optical axis as described earlier and controlling the position of the object on a plane at right angles to the optical axis, it becomes possible to three-dimensionally and electrically control the image-forming point. This makes it possible to correct astigmia in which the focal position is deviated up and down or right and left and, particularly, to completely adjust the astigmia that is distorted in a complex manner relying upon the feedback while making sure the practical image-forming state and to prepare an eye that is written into a nonvolatile memory. There can further be easily realized a structure that can be finely adjusted by a user by adding electrical fine correction data. Similarly, a microscope having a small depth of focus may be fitted with this liquid crystal active lens to move the focal point without crushing the object with the object glass.

Figure 10A:
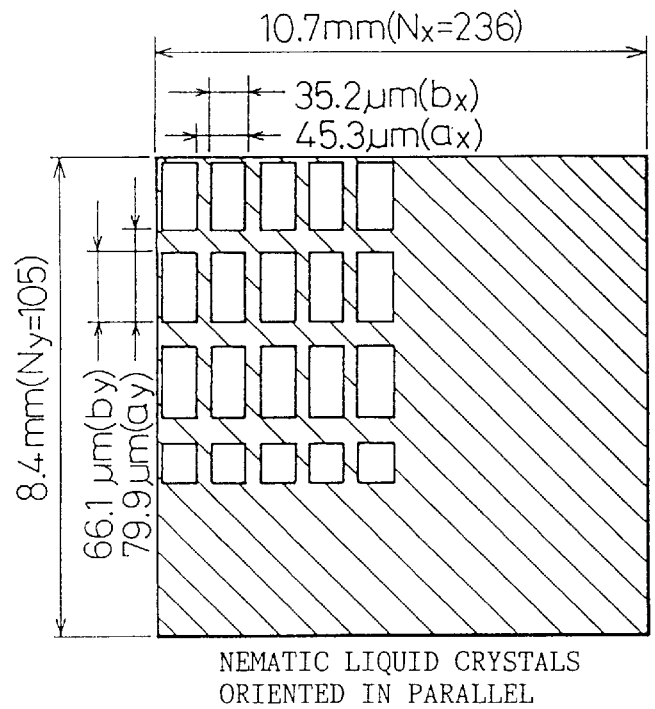
FIGS. 10a and 10b illustrate the shape and size of the liquid crystal element and the shape and size of the lens used for the embodiment of the present invention.
Figure 10B:
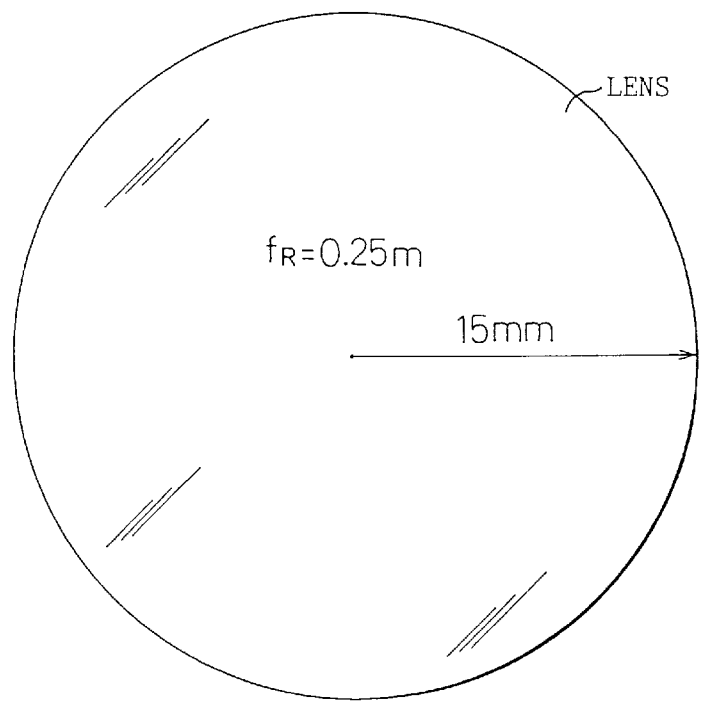
Figure 11:
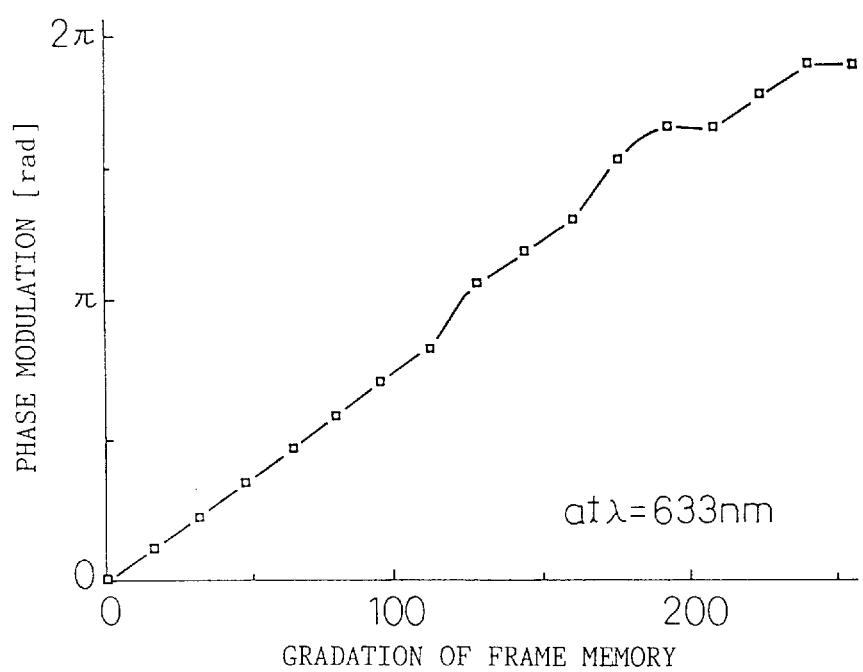
FIG. 11 illustrates the characteristics of a liquid crystal phase modulation element used for the embodiment of the present invention.
Figure 12:
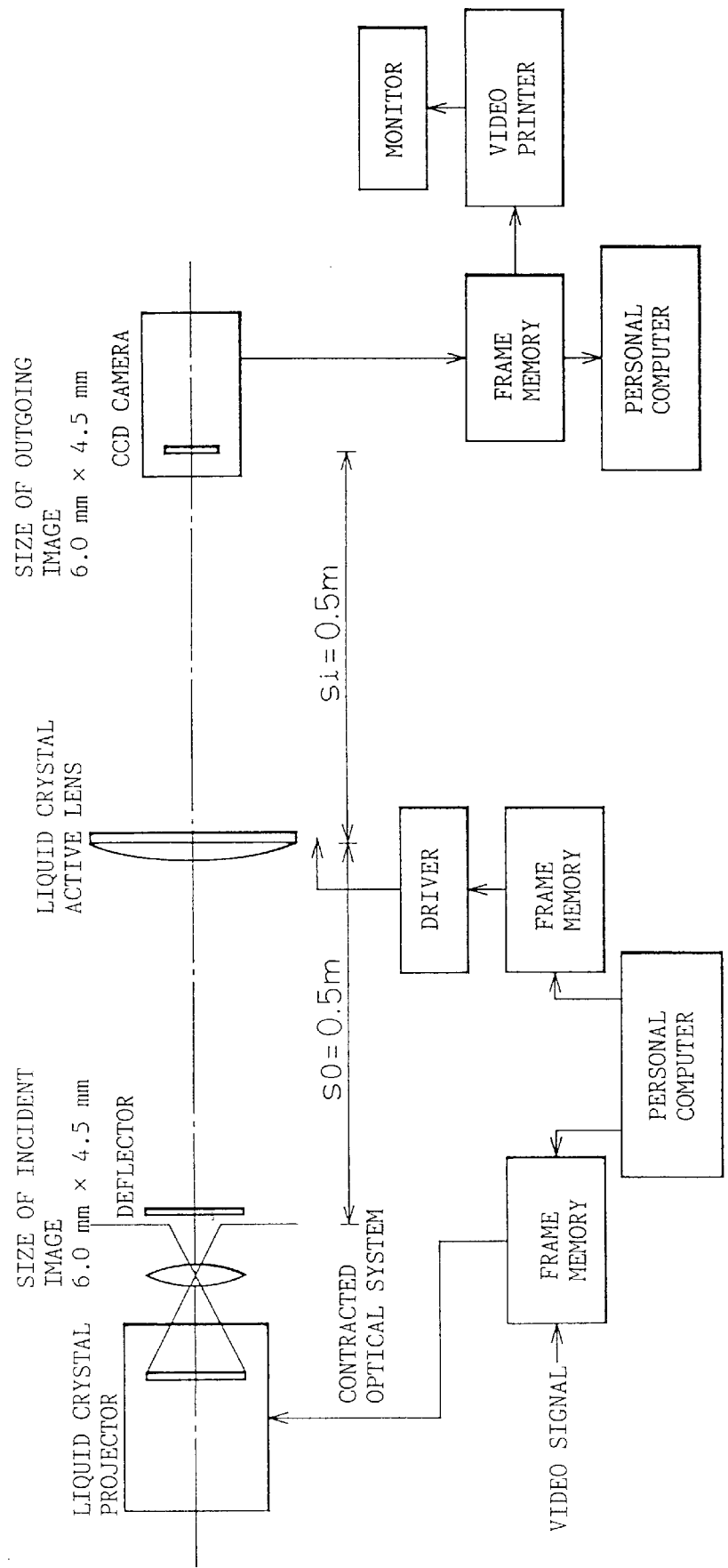
FIG. 12 illustrates an apparatus for an experiment used for confirming the embodiment of the present invention.

FIG. 9 shows the shape of a lens used for the embodiment of the present invention, FIGS. 10a and 10b show sizes of the liquid crystal element. FIG. 10a shows one example of the size of pixels and arrangement of the parallel oriented liquid crystal elements, and FIG. 10b shows one example of a fixed focus line. FIG. 11 shows values (radian) of phase modulation for the gradation of a frame memory for driving liquid crystals. This figure shows the relationship between the gradation of the frame memory and the phase modulation. FIG. 12 schematically illustrates an apparatus used for evaluating the characteristics of the liquid crystal active lens of the present invention. FIG. 12 shows the apparatus for the experiment for confirming the embodiment, and this apparatus is formed by, for example, a personal computer. A two-dimensional phase distribution of fine liquid crystal pixels is calculated by using a calculation chip available in the market, and is stored in a screen storage circuit. The liquid crystals are driven based upon the stored screen information, and undesired distortion is not generated by the liquid crystal active lens, which is caused by incomplete information which has not yet been completely processed.

Figure 13:
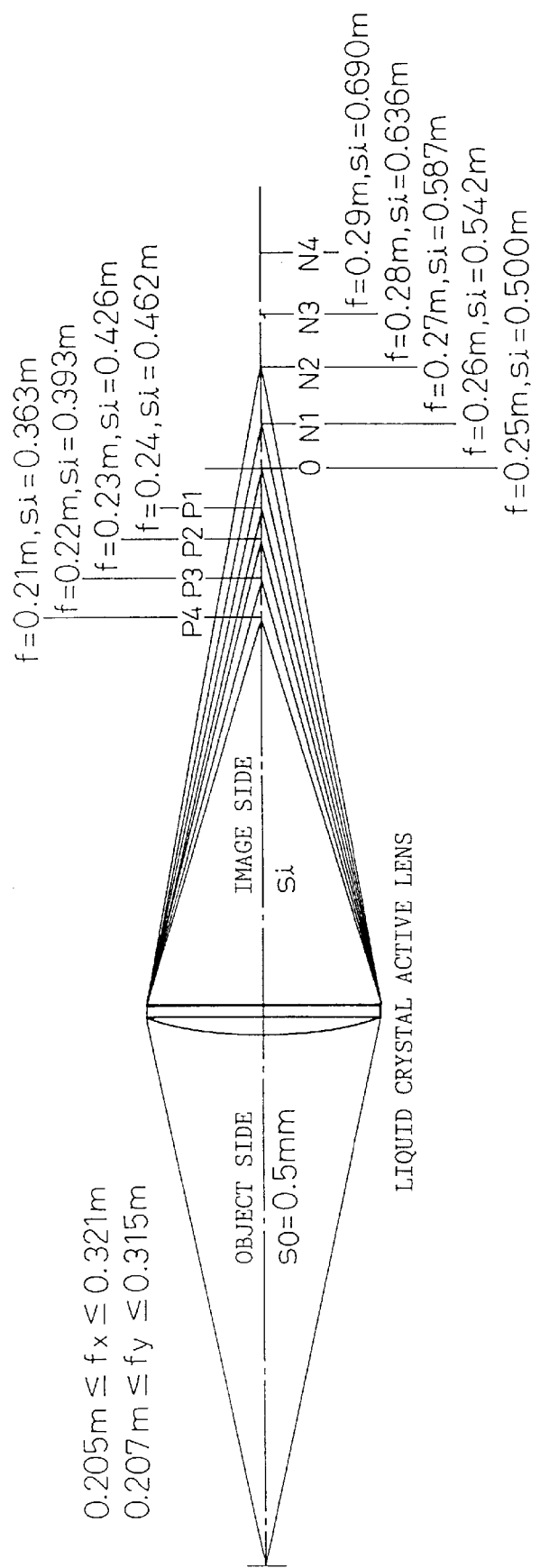
FIG. 13 illustrates the characteristics of a liquid crystal active lens element used for the embodiment of the present invention.
Figure 14:
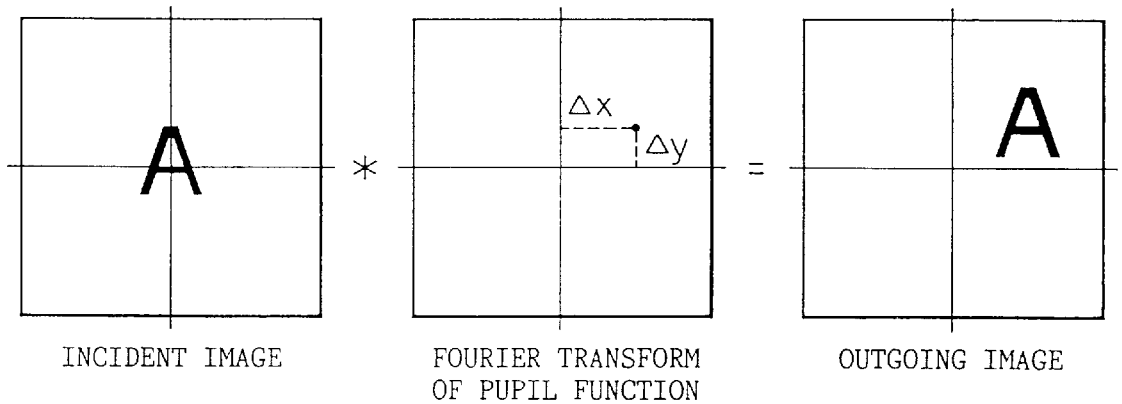
FIG. 14 illustrates the relationship between the incident image, the pupil function and the outgoing image for explaining the action in the lateral direction according to the present invention.
Figure 15:
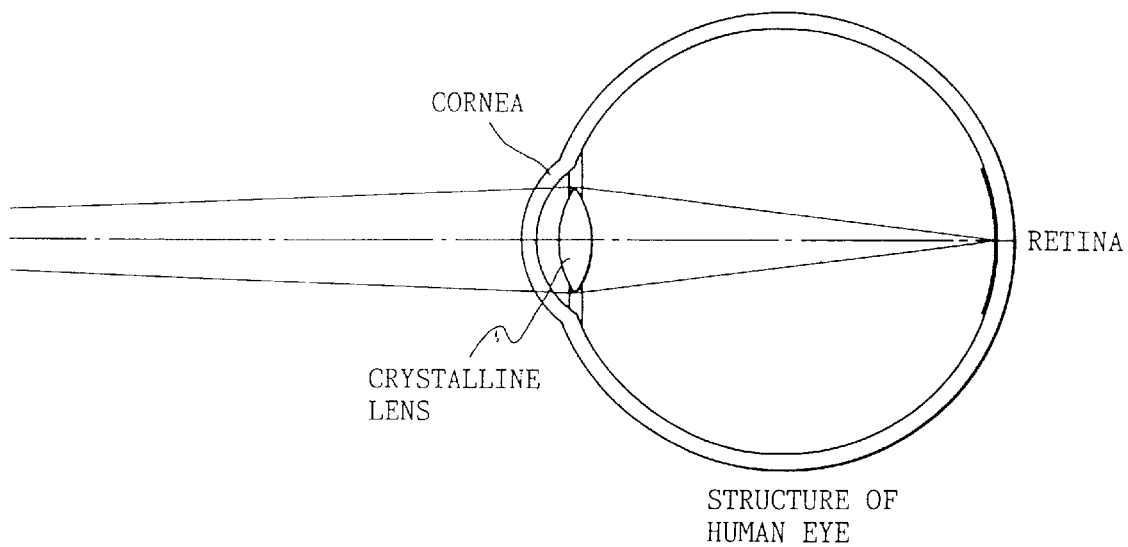
FIG. 15 illustrates the optical structure of a human eye compared to the optical constitution of the present invention.
Figure 16A:
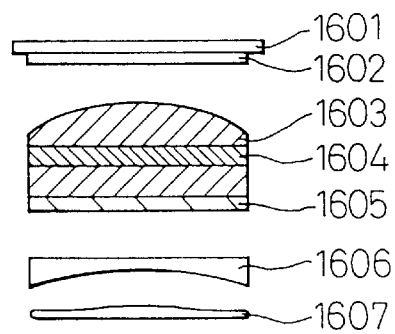
FIG. 16(A) illustrates a structure which serves both as a lens glass and as a liquid crystal substrate.
Figure 16B:
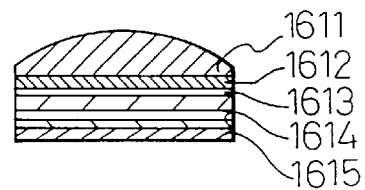
FIG. 16(B) illustrates an embodiment where a phase correction plate for correcting color is used in combination.
Figure 16C:
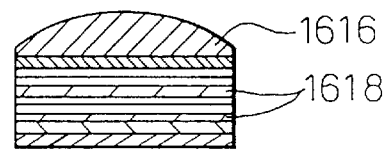
FIG. 16(C) illustrates the constitution of the liquid crystal active lens obtained by combining a plurality of liquid crystal phase modulation plates.

FIG. 13 shows experimental results of image-forming positions in the vertical direction of the optical axis of the liquid crystal active lens. This figure shows image formation points as a result of experiment. FIG. 14 illustrates an example where the outgoing image is moved in a lateral direction on the image-forming plane by controlling the pupil function in the lateral direction. FIG. 14 shows movement of the output image A in accordance with the results of calculations of convolution for the input image A and the pupil function by means of the active lens. As is clear from above explanations, the liquid crystal active lens includes a means for controlling the focus position of the image point on the optical axis and a means for scanning on the plane perpendicular to the optical axis so that it is possible to electrically control the pupil function. Accordingly, it is possible to three-dimensionally control the image point of the output image a on the optical axis and on the plane perpendicular to the optical axis. FIG. 15 illustrates an example of the optical system of a human eye. This figure shows the optical structure of a human eye compared to the structure of FIG. 14. The active lens of the present invention has the same functions as the human eye. The constitution is similar to the human eye which adjusts the focal point by the combination of a corneal lens having power and a variable crystalline lens having a small refractive power. The liquid crystal plate of the present invention corresponds to the crystalline lens and the fixed lens corresponds to the cornea. FIGS. 16(a) to 16(c) illustrate an embodiment of the liquid crystal active lens of the present invention, wherein FIG. 16(a) illustrates the constitution where one surface of a lens 1603 is made flat and a transparent electrode is formed thereon so that it serves as one side of the substrate of the liquid crystal element. An advantage is obtained in that undesired multiple reflection is suppressed between the lens 1603 and the liquid crystal 1604. Therefore, a linear polarizer plate 1602 is disposed on the outside of the lens and is further covered with a glass filter 1601 which stops ultraviolet rays. The glass filter 1601 also prevents the polarizer plate from being deteriorated by ultraviolet rays. On the other side of the lens are disposed other optical elements 1606 and 1607 via a polarizer plate. Therefore, the surface polarizer plate is covered with lenses and will not be scarred. FIG. 16(b) illustrates the construction in which liquid crystal plates are superposed one upon another with a color correction plate 1613 interposed among them to meet strict requirements of color balance such as imaging the object using a camera. This is used to correct the dependency of the amount of phase shift of the liquid crystal plate 1615 upon the wavelength of the phase of the transmitted light. A polarizer plate 1612 is stuck to a lens 1611, and besides a phase correction plate 1613, a liquid crystal plate 1614 and another polarizer plate 1615 are superposed one upon another. FIG. 16(c) illustrates the structure in which a plurality of liquid crystal plates 1618 are stuck to a fixed lens 1616. This is convenient for increasing the amount of phase modulation or for effecting two kinds of corrections independently of each other.

Figure 17:
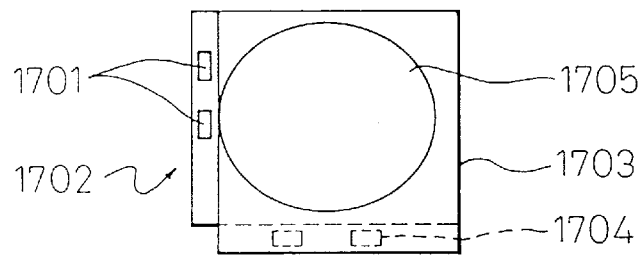
FIG. 17 illustrates an embodiment of a constitution in which a liquid crystal substrate of the liquid crystal active lens of the present invention is driven by an IC that is mounted on the substrate.

FIG. 17 illustrates an example in which a rectangular liquid crystal substrate 1703 and a circular fixed lens 1705 are combined together, and integrated liquid crystal drive circuits 1701 and 1704 are formed on a liquid crystal substrate. Integrated circuits for driving a number of pixels on the liquid crystal plate are mounted on the board to decrease the amount of electric wiring that is connected to external units, presenting an advantage from a practical point of view.

Figure 18:
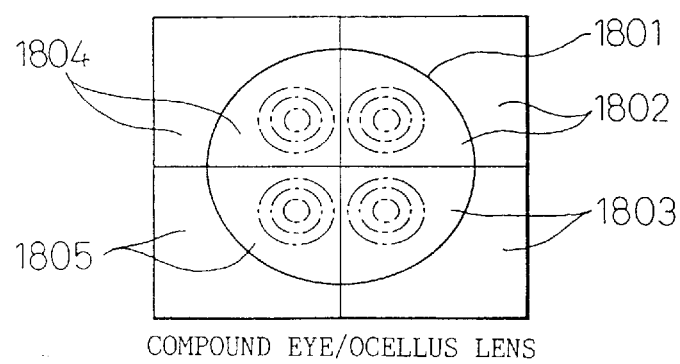
FIG. 18 illustrates an embodiment of a constitution in which the liquid crystal active lens of the present invention is divided into a plurality of regions so as to be controlled independently of one another.

FIG. 18 illustrates the application of the liquid crystal lens of the present invention wherein a piece of liquid crystal plate is stuck to a fixed lens 1801 and the pixel region is divided into four regions 1802, 1803, 1804 and 1805 which are then controlled like separate lenses. In this system, the four lenses can be used in a manner as though they are arranged on a plane, and four image-forming points can be formed quite independently from each other. The incident image can be freely sorted onto the separate sensor elements and the division can be freely changed. The lens can be instantaneously changed over into a compound eye or an ocellus. By using this lens, the contour can be picked up by slightly deviating the formed image to effect the addition and substraction in regard to the phase and to correct high-frequency component of spacial frequency components.

Figure 19:
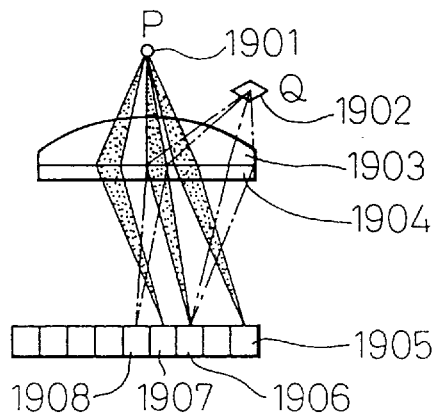
FIG. 19 illustrates a constitution in which many object images are independently focused on separate points by separately controlling the lens regions of the liquid crystal active lens of the present invention.

FIG. 19 illustrates an example where many points of an image plane and many points of an object plane are coupled together. In FIG. 19, point images 1901 and 1902 are optically formed on the light-receiving portions 1905, 1906, 1907 and 1908 of a division lens of a liquid crystal plate 1903 of the liquid crystal active lens 1904 of the present invention independently of each other. The image formations are independently of each other making it possible to control complex pairs of relations without worrying about poor contact in electric wiring. By utilizing this constitution, the lens can be used in a divided manner to take a three dimensional image and to measure the distance.

Figure 20A:
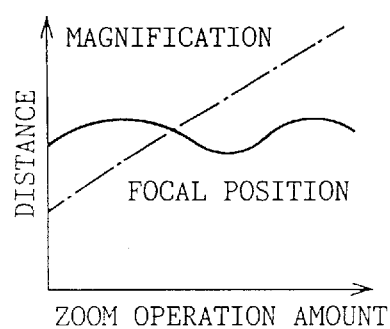
FIGS. 20(a) and 20(b) illustrate a constitution for electrically controlling the focal point of a liquid crystal projector obtained by combining the liquid crystal active lens with a liquid crystal space modulation element that outputs a linearly polarized image according to an embodiment of the present invention.
Figure 20B:
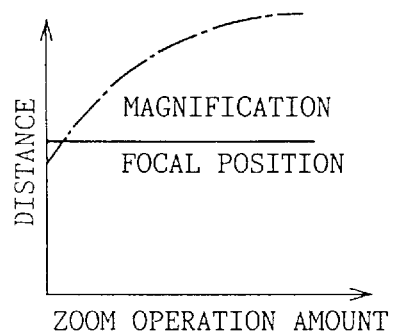

FIGS. 20(a) and 20(b) illustrate an example where the action of the liquid crystal active lens of the present invention is adapted to a zoom lens. By using the liquid crystal active lens of the present invention instead of the conventional moving lens, a change in the position, on the optical axis, of the image-forming plane can be corrected to remain constant, or a zoom lens can be constituted without having moving portion, or a change in the image-forming position shown in FIG. 20(a) can be corrected to become as shown in FIG. 20(b) in a conventional zoom lens system which uses fixed lenses and has a large magnification and a high resolution.

Figure 21:
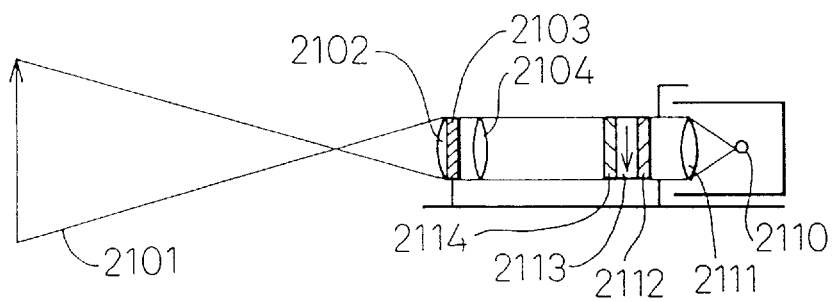
FIG. 21 is a diagram showing an active liquid crystal lens of the present invention adapted to a zoom image-forming system of a liquid crystal projector.

FIG. 21 illustrates an example in which the active liquid crystal lens of the present invention is adapted to the zoom image-forming system of a liquid crystal projector. In the liquid crystal projector, the image is obtained by using linear polarization with which the lens of the invention matches well. The lens of the invention filters the light that vibrates in the same direction as the image-forming liquid crystal modulation element. Hence, no linear polarizer plate is required on the side of the lens. Here, the light emitted from a source of light 2110 passes through a focusing lens 2111 and is linearly polarized by a linear polarizer plate 2112, modulated for its polarization degree through a liquid crystal element 2113, and is passed through a light detector or a linear polarizer plate 2114 so as to assume a polarized plane that is in agreement with a lens 2104 and with the liquid crystal active lens of the present invention. Since the polarization plane of the active lens 2102 is in agreement with the polarization plane of the polarizer plate 2114, the polarization plate on one side can be omitted. The light that has passed through the active lens 2102 is projected onto the projection screen to obtain an image 2101.

Being combined with a fixed lens having power as described above, there is realized a convenient electrically controlled lens, featuring the great advantage of electric control owing to liquid crystals, that did not exist in the past. The effects of the present invention stem from phase modulation characteristics of liquid crystals and from fine pixels that can be independently controlled. For this purpose, active switching elements must be coupled to the pixels of the parallel-oriented liquid crystal elements or the electro-optical coefficient must be increased by twisting the liquid crystal orientation. Employment of a twisted structure of 90 degrees, 180 degrees or 270 degrees is effective in improving the sensitivity of generated voltage.

The lens of the present invention is effective in executing various processes that could not be done with the conventional optical systems, such as correcting an astigmatic optical system having different focal points in the vertical direction and in the lateral direction and correcting distortion components that could not be corrected with the spherical lens and is, hence, effective in correcting complex astigmia or presbyopia.

As described above, the liquid crystal active lens of the present invention makes it possible to electrically control the focal length, image-forming position and magnification of the optical system without using a mechanically moved portion, and is excellent in stability, weight and reliability. The liquid crystal active lens of the present invention can further be used in wide range of applications such as correcting astigmatism, image processing and multiple optical connections formed among a plurality of points in image and a plurality points in object.

We claim:

1. An optical device for electrically controlling optical characteristics, comprising:

an electrically controlled phase modulation liquid crystal element having a plurality of fine image pixels with a variable refractive force, said fine image pixels being positioned relative to one another in two dimensions for modulating a phase of transmitted light waves;

a plurality of drive electrodes, including timing and data electrodes, coupled to the phase modulation liquid crystal element for driving each of said fine image pixels by time division, and a lens with a fixed focus and having either a positive or negative refractive force larger than the refractive force of the fine image pixels optically coupled to the phase modulation liquid crystal element to define an optical system.

2. An optical device according to claim 1, wherein the liquid crystal element is a parallel-oriented nematic liquid crystal element.

3. An optical device according to claim 1, wherein the liquid crystal element is a nematic liquid crystal element having a twisted structure.

4. An optical device according to claim 1, wherein the phase modulation liquid crystal element comprises:

a glass substrate, said plurality of drive electrodes forming an integral structure on said glass substrate;

an integrated circuit mounted to said glass substrate and coupled to the plurality of drive electrodes; and a drive circuit mounted on the glass substrate coupled to and driven by the integrated circuit for driving the fine image liquid crystal pixels.

5. An optical device according to claim 1, further comprising an amplitude modulation element of the time-division driven fine liquid crystal pixels for removing or suppressing optical noise components.

6. An optical device according to claim 1, wherein the electrically controlled phase modulation element of the time-division driven fine liquid crystal pixels and the lens in combination control the focal length of the optical device.

7. An optical device according to claim 1, wherein the electrically controlled phase modulation element varies magnification while maintaining a fixed focal length.

8. An optical device according to claim 1, wherein the electrically controlled phase modulation element controls an image-forming position of the lens on a plane at right angles to an optical axis.

9. An optical device according to claim 1, wherein the electrically controlled phase modulation element controls tracing of focal length of the optical system for transmitting an image near a preset image focusing position to a pupil location to mask light over areas where no image is formed.

10. An optical device according to claim 4, wherein the electrically controlled phase modulation element corrects distortion of the optical system.

11. An optical device according to claim 1, wherein the electrically controlled phase modulation element electrically corrects astigmatic spectacles and prebyopia in a composite manner.

12. An optical device according to claim 1, wherein the electrically controlled phase modulation element identifies an image by image information, said image information being separately set or identification confirmed and judged.

13. An optical device according to claim 1, further comprising, a color filter disposed on the fine liquid crystal pixels, said color filter and electrical control of the pixels being operative to correct a color aberration of an image, to separate a color, or to change the color in a time division manner.

14. An optical device according to claim 1 wherein the electrically controlled phase modulation element forms an optical interconnection, said optical interconnection coupling first multi-point optical information terminals and second multi-point optical information terminals while maintaining an image-forming relationship with the phase modulation element.

15. An optical device according to claim 1 wherein the electrically controlled phase modulation element forms a neural network, said neural network employing an optical interconnection, said optical interconnection coupling first multi-point optical information terminals and second multi-point optical information terminals while maintaining an image-forming relationship with the phase modulation element.

* * * * *